(12) United States Patent
Ren et al.

(10) Patent No.: US 11,898,595 B2
(45) Date of Patent: Feb. 13, 2024

(54) SURFACE FASTENER

(71) Applicant: YKK Corporation, Tokyo (JP)

(72) Inventors: Zhiyu Ren, Kurobe (JP); Atsushi Nakaya, Kurobe (JP); Yuta Inoue, Kurobe (JP)

(73) Assignee: YKK Corporation, Tokyo (JP)

( * ) Notice: Subject to any disclaimer, the term of this patent is extended or adjusted under 35 U.S.C. 154(b) by 78 days.

(21) Appl. No.: 17/634,204

(22) PCT Filed: Jul. 10, 2020

(86) PCT No.: PCT/JP2020/027098
§ 371 (c)(1),
(2) Date: Feb. 9, 2022

(87) PCT Pub. No.: WO2021/039151
PCT Pub. Date: Mar. 4, 2021

(65) Prior Publication Data
US 2022/0312905 A1    Oct. 6, 2022

(30) Foreign Application Priority Data

Aug. 30, 2019   (WO) .................. PCT/JP2019/034183
Dec. 20, 2019   (JP) ................................ 2019-230845
Feb. 18, 2020   (WO) .................. PCT/JP2020/006338

(51) Int. Cl.
*A44B 18/00* (2006.01)
*F16B 5/07* (2006.01)

(52) U.S. Cl.
CPC ............ *F16B 5/07* (2013.01); *A44B 18/0003* (2013.01)

(58) Field of Classification Search
CPC ............ A44B 18/0003; A44B 18/0069; A44B 18/0076; F16B 5/07; Y10T 24/27
See application file for complete search history.

(56) References Cited

U.S. PATENT DOCUMENTS 5,422,156 A     6/1995   Billarant
5,786,061 A *   7/1998   Banfield ................. B29C 33/16
                                                    24/442

(Continued)

FOREIGN PATENT DOCUMENTS

JP    H09-506559 A    6/1997
JP    2002-540872 A  12/2002

(Continued)

OTHER PUBLICATIONS

European Extended Search Report, European Patent Application No. 20859222.0, dated Sep. 29, 2022, 10 pages.

(Continued)

*Primary Examiner* — Robert Sandy
*Assistant Examiner* — Michael S Lee
(74) *Attorney, Agent, or Firm* — Kilpatrick Townsend & Stockton LLP

(57) ABSTRACT

Provided is a surface fastener in which a decrease in engagement strength can be suppressed when a masking member is peeled off. This surface fastener includes a fastener member and a masking member. The fastener member includes a base portion and a plurality of engaging elements. The masking member covers at least a part of the engaging elements. At least one recess portion is provided on a masking outer surface of the masking member.

13 Claims, 15 Drawing Sheets

(56) References Cited

U.S. PATENT DOCUMENTS

| | | | |
|---|---|---|---|
| 6,303,062 | B1 | 10/2001 | Aamodt et al. |
| 6,656,563 | B1 * | 12/2003 | Leach ................ B29C 48/35 24/442 |
| 9,936,773 | B2 * | 4/2018 | Okuda ............. A44B 18/0076 |
| 2010/0139004 | A1 | 6/2010 | Cheng |
| 2010/0162535 | A1 | 7/2010 | Cheng |
| 2011/0197404 | A1 | 8/2011 | Terada et al. |
| 2012/0011685 | A1 | 1/2012 | Rocha |
| 2014/0298628 | A1 | 10/2014 | Minato et al. |
| 2017/0295890 | A1 | 10/2017 | Imai et al. |
| 2022/0290706 | A1 * | 9/2022 | Ren ................... A44B 18/0003 |

FOREIGN PATENT DOCUMENTS

| | | |
|---|---|---|
| JP | 2010-131353 A | 6/2010 |
| JP | 2013-530796 A | 8/2013 |
| WO | 1995/01741 A1 | 1/1995 |
| WO | 2010/052779 A1 | 5/2010 |
| WO | 2010/146667 A1 | 12/2010 |
| WO | 2013/061423 A1 | 5/2013 |

OTHER PUBLICATIONS

Office Action, Japanese Patent Application No. 2021-541978, dated Oct. 18, 2022, 12 pages.
Office Action, Japanese Patent Application No. 2021-542606, dated Oct. 18, 2022, 10 pages.
International Search Report, PCT Patent Application No. PCT/JP2020/027098, dated Oct. 13, 2020.
Decision of Rejection, Japanese Patent Application No. 2021-541978, dated Feb. 7, 2023, 10 pages.
European Extended Search Report, European Patent Application No. 20857912.8, dated Oct. 10, 2022, 7 pages.
International Search Report and Written Opinion, PCT Patent Application No. PCT/JP2020/006338, dated May 19, 2020, 10 pages.

* cited by examiner

SURFACE FASTENER

TECHNICAL FIELD

The invention relates to a surface fastener including a fastener member and a masking member detachably held by the fastener member.

BACKGROUND ART

A cushion body with a surface fastener is used, for example, for a seat of an automobile or a train. The surface fastener includes a base portion and a plurality of hook-shaped engaging elements erected on the base portion, and is sometimes referred to as a hook member. In addition, a surface fastener obtained by molding a thermoplastic resin may be referred to as a molded surface fastener.

When a skin member made of fiber fabric or the like is put on the surface of such a cushion body with a surface fastener, a loop member having a plurality of loops is provided on the back surface of the skin member. Therefore, by engaging the loop member with the surface fastener (hook member) provided on the cushion body, the skin member can be covered and fixed to the surface of the cushion body.

In a case where such a cushion body with a surface fastener is manufactured by foam-molding, when the foam resin enters a region (engaging area) where the engaging element of the surface fastener is disposed, there has been a problem that it is difficult to engage the loop of the loop member with the engaging element and that the engagement strength (peeling strength) of the surface fastener with respect to the loop member is decreased. For this reason, conventionally, as one of the methods for preventing the foam resin from entering the engaging area of the surface fastener, it is known that the engaging area of the surface fastener is covered with a masking member when foam-molding of the cushion body is performed.

For example, JP H9-506559 A (Patent Document 1) discloses a surface fastener 100 illustrated in FIG. 24. The surface fastener 100 of Patent Document 1 includes a fastener member 101 made of synthetic resin and an elastomer surrounding part 102 serving as a masking member. The fastener member 101 includes a base portion 103 and a hook-shaped engaging element (hook element) 104. The base portion 103 supports the plurality of engaging elements 104.

The elastomer surrounding part 102 is formed to completely wrap the engaging elements 104 of the fastener member 101 and to be peeled off from the fastener member 101. The elastomer surrounding part 102 contains iron particles. The elastomer surrounding part 102 is formed by coating the surface of the fastener member 101 on which the engaging elements 104 are formed with a liquid composition, and then drying the coated liquid composition in an oven.

Such a surface fastener 100 of Patent Document 1 is held at a predetermined position of a die by utilizing a magnetic force generated between the magnet of the die and iron particles contained in the elastomer surrounding part 102 by attaching a magnet to the die used for foam-molding of the cushion body. In addition, when the foam-molding of the cushion body is performed using the die holding the surface fastener 100, since the engaging elements 104 of the fastener member 101 are completely wrapped by the elastomer surrounding part 102, it is possible to prevent the foam resin from entering between the engaging elements 104 of the surface fastener 100. Therefore, the plurality of engaging elements 104 not contaminated by the foam resin can be exposed by peeling off the elastomer surrounding part 102 from the fastener member 101 after the foam-molding of the cushion body. Therefore, the loop member can be stably engaged with the surface fastener 100.

CITATION LIST

Patent Document

Patent Document 1: JP H9-506559 A

SUMMARY OF INVENTION

Technical Problem

When the foam-molding of the cushion body is performed in a state where the surface fastener 100 of Patent Document 1 is held in the die using the above-described magnetic force, as described above, although the foam resin can be prevented from entering between the engaging elements 104 wrapped by the elastomer surrounding part (masking member) 102, the foam resin may enter between the elastomer surrounding part 102 and the die (in particular, a magnet provided in the die), and as a result, a thin film-like foam body may be formed to cover the elastomer surrounding part 102.

The thin film-shaped foam body formed between the elastomer surrounding part 102 and the die as described above may remain above or in the vicinity of the engaging elements and cover the engaging area even after the elastomer surrounding part 102 is peeled off from the fastener member 101 after the foam-molding of the cushion body. As a result, it becomes difficult for the loop of the loop member to engage with the engaging element 104 of the surface fastener 100, and the engagement strength of the surface fastener 100 may be decreased.

The invention has been made in view of the above problems, and an object of the invention is to provide a surface fastener capable of suppressing a decrease in engagement strength when a masking member is peeled off after foam-molding of a cushion body.

Solution to Problem

In order to achieve the above object, the surface fastener provided by the invention includes: a fastener member and a masking member removably held by the fastener member, in which the fastener member includes a base portion that is long and has a first surface and a second surface, and a plurality of engaging elements protruding from the first surface of the base portion, the masking member is disposed on the first surface of the base portion and covers at least a part of the engaging elements, the masking member has a masking inner surface facing the base portion and a masking outer surface disposed on an opposite side (in an upper-lower direction) to the masking inner surface, and the masking outer surface is provided with at least one recess portion (recessed toward the base portion).

According to such a surface fastener of the invention, even when a thin foam body is formed between the masking member and the die in foam-molding of the cushion body, the foam body can be easily fixed to the masking outer surface of the masking member. Thus, since the thin foam body can be easily removed by peeling off the masking member from the fastener member after the foam-molding, it becomes difficult for the plurality of engaging elements of the fastener member to be covered with the foam body. As a result, it is possible to suppress a decrease in engagement strength in the fastener member integrated with the foam body.

When the surface fastener is held in the molding die of the cushion body, by utilizing the magnetic force between the magnet installed in the die and the magnetic particles contained in the surface fastener, it is possible to obtain a self-alignment effect in which the position and direction of the surface fastener to be attached to the die can be automatically adjusted in accordance with the magnet. Further, since the recess portion is provided on the masking outer surface as in the invention, it is possible to reduce the contact area between the surface fastener and the die to reduce the frictional resistance generated between the surface fastener and the die. Accordingly, the self-alignment effect is improved.

In the surface fastener according to the invention, the recess portion is preferably disposed inward away from a side edge position in the width direction of the masking member. Thus, when the masking member is peeled off from the fastener member after the foam-molding, the foam body can be easily cut off in the region outside the width direction of the recess portion. Accordingly, the foam body covering the masking member can be easily removed.

In the surface fastener of the invention, the recess portion of the masking member preferably includes a vertical groove portion provided along a longitudinal direction of the fastener member. In addition, the recess portion of the masking member preferably includes a plurality of depressed portions provided intermittently along a longitudinal direction of the fastener member. Further, the recess portion of the masking member preferably includes a plurality of lateral groove portions provided along a width direction of the fastener member.

By forming the recess portion in the form as described above on the masking outer surface of the masking member, the foam body formed between the masking member and the die can be easily guided into the recess portion, and the foam body can be more easily fixed to the masking outer surface of the masking member, thus, an anchor effect of the masking member with respect to the foam body can be enhanced.

In the surface fastener of the invention, the recess portion of the masking member preferably includes a plurality of the recess portions having different depths from the masking outer surface to the bottom portion of the recess portion. Thus, the strength of the masking member can be secured, and the anchor effect of the masking member with respect to the foam body can be enhanced.

Further, in the surface fastener of the invention, the masking outer surface of the masking member preferably undulates in a height direction along a longitudinal direction of the fastener member. Thus, the foam body formed between the masking member and the die can be more easily fixed to the masking outer surface, so that the anchor effect for fixing the foam body of the masking member can be further enhanced.

In the surface fastener of the invention, the masking member preferably contains magnetic particles. This makes it possible to more easily hold the surface fastener with respect to the die on which the magnet is installed. Further, the self-alignment effect of the surface fastener can be improved.

In this case, the masking member preferably includes a masking main body having an inner surface facing the base portion and an outer surface disposed on an opposite side to the inner surface, and an outer film portion covering at least a part of the outer surface of the masking main body, and the outer film portion preferably has frictional resistance lower than that of the masking main body. Thus, the position and direction of the surface fastener attached to the die can be more easily and automatically adjusted by the above-described self-alignment effect.

In addition, at least one recess portion is preferably provided on the outer surface of the masking main body. Thus, the fixing strength between the masking main body and the outer film portion can be enhanced.

In the surface fastener of the invention, the recess portion of the masking outer surface may be provided to include an end part in a width direction of the masking outer surface. In addition, the recess portion of the masking outer surface may be provided along a longitudinal direction of the fastener member at both end parts in a width direction of the masking outer surface. This makes it easy to fix the foam body formed at the time of foam-molding of the cushion body to the masking outer surface of the masking member.

The fastener member preferably includes an engaging area including the plurality of the engaging elements, and left and right vertical wall portions disposed outside a width direction of the engaging area and provided along a longitudinal direction of the fastener member, the masking member preferably has a side edge portion at each of both end parts in a width direction of the masking outer surface, and the side edge portion is preferably disposed adjacent to an inner side of the vertical wall portion along a longitudinal direction of the fastener member.

Thus, the strength at the left and right end parts of the masking member can be improved. Accordingly, intruding of the foam resin into the inside of the left and right side edge portions of the masking member can be further suppressed during the foam-molding of the cushion body. In addition, a step is provided between the masking outer surface and the upper surface of the side edge portion in the masking member, and the foam body formed on the side edge portion can be made thinner. Therefore, when the masking member is peeled off from the fastener member after the foam-molding, the foam body can be easily cut off in the region of the side edge portion disposed between the masking outer surface and the vertical wall portion. Accordingly, the foam body that may cover the plurality of engaging elements can be stably removed.

Advantageous Effects of Invention

According to the surface fastener of the invention, it is possible to suppress a decrease in engagement strength in the fastener member integrated with the foam body.

DESCRIPTION OF EMBODIMENTS

Hereinafter, preferred embodiments of the invention will be described in detail with reference to the drawings by way of examples. Note that the invention is not limited at all to the embodiments described below, and various modified examples can be made as long as the invention has substantially the same configuration and exhibits similar effects. For example, in the invention, the length dimension and the width dimension of the surface fastener, the number, the arrangement position, the formation density of engaging elements provided in the fastener member of the surface fastener and the like are not particularly limited, and can be arbitrarily changed.

First Embodiment

Figure 1:
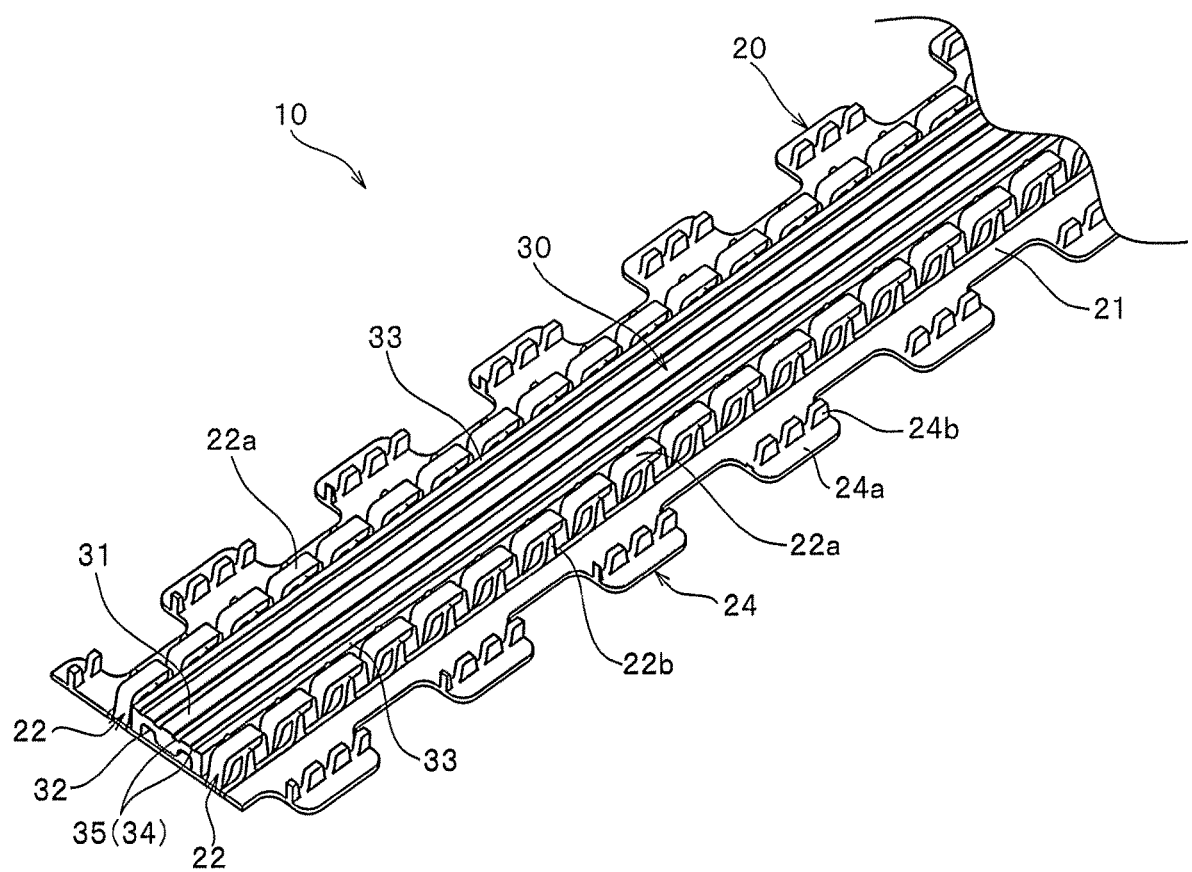
FIG. 1 is a perspective view schematically illustrating a surface fastener according to a first embodiment of the invention.
Figure 2:
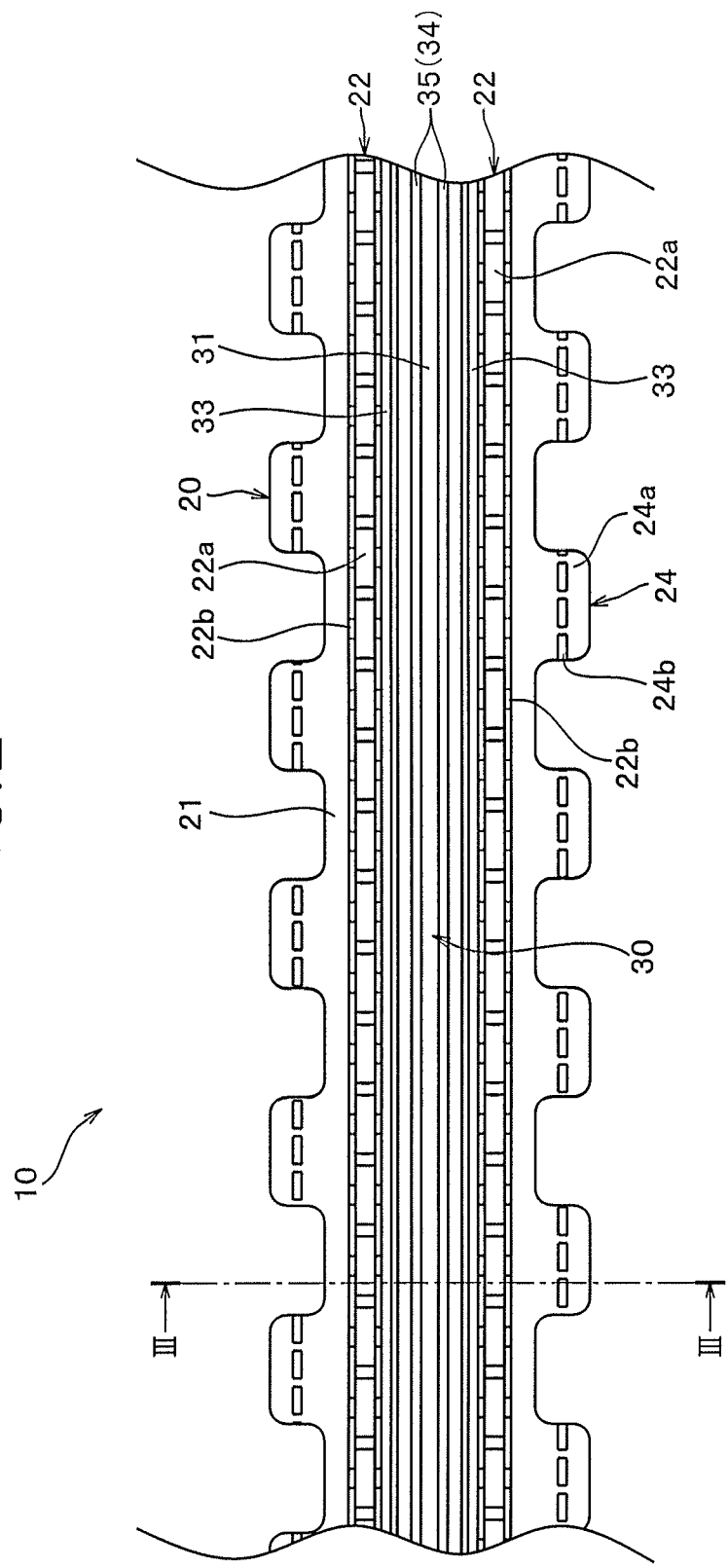
FIG. 2 is a plan view of the surface fastener illustrated in FIG. 1.
Figure 3:
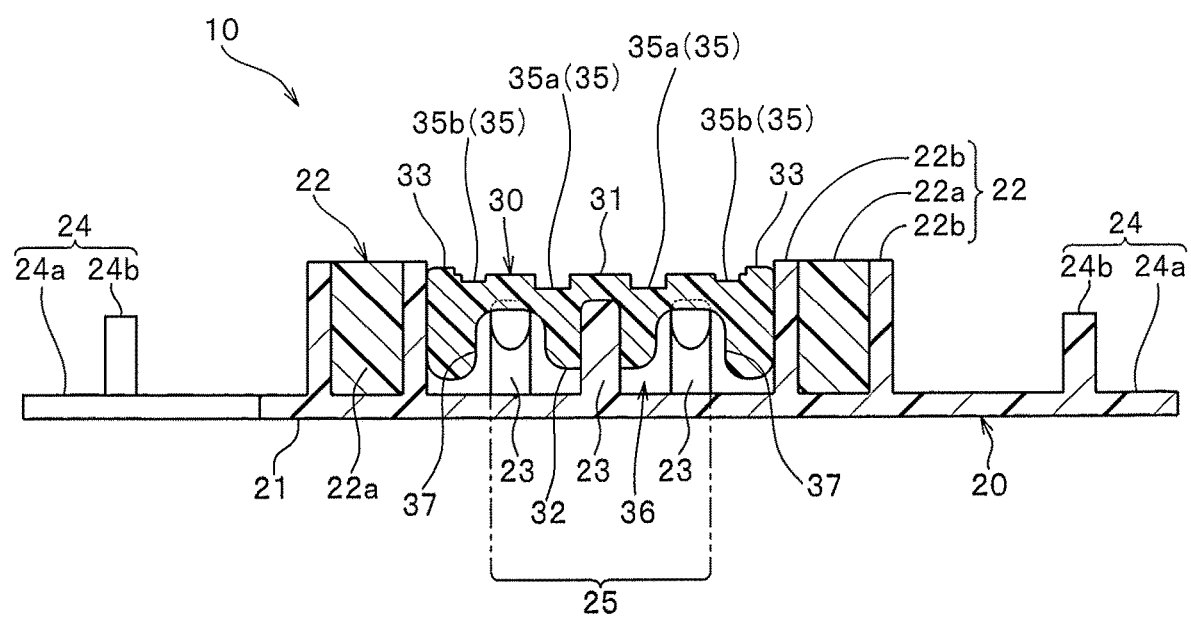
FIG. 3 is a cross-sectional view taken along line illustrated in FIG. 2.
Figure 4:
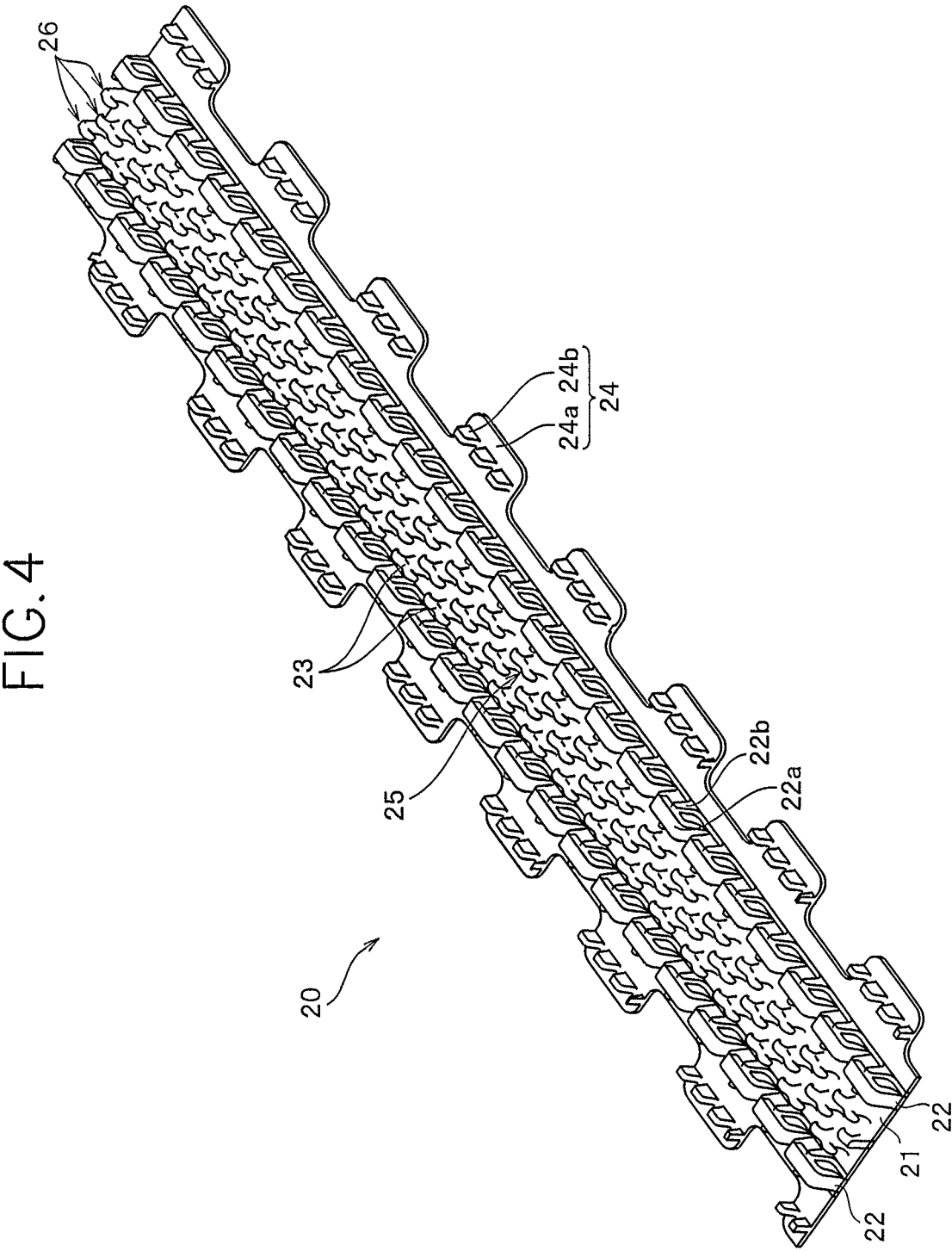
FIG. 4 is a perspective view schematically illustrating a fastener member of the surface fastener illustrated in FIG. 1.

FIG. 1 is a perspective view schematically illustrating a surface fastener according to a first embodiment. FIG. 2 is a plan view of the surface fastener, and FIG. 3 is a cross-sectional view taken along line illustrated in FIG. 2. FIG. 4 is a perspective view schematically illustrating a fastener member forming the surface fastener.

In the following description, the front-rear direction of the surface fastener refers to a longitudinal direction of the fastener member molded to be long, and the front-rear direction is, for example, a direction along a machine direction (MD) in which the fastener member is continuously molded in a manufacturing process of the surface fastener.

The left-right direction refers to a width direction orthogonal to the front-rear direction and along the upper surface of the base portion of the fastener member. In this case, the left-right direction and the width direction can also be referred to as an cross direction (CD) orthogonal to the machine direction (MD). The upper-lower direction refers to a height direction or a thickness direction orthogonal to the upper surface of the base portion of the fastener member. In particular, a direction in which the engaging elements protrude with respect to the base portion is defined as an upper side, and a direction opposite to it is defined as a lower side.

A surface fastener 10 according to the first embodiment includes a fastener member 20 made of synthetic resin and formed long in the front-rear direction, and a masking member 30 detachably held on an upper surface side (first surface side) of the fastener member 20.

The fastener member 20 includes a plate-shaped base portion 21, an engaging area 25 including a plurality of hook-shaped engaging elements 23 protruding from the upper surface of the base portion 21, left and right vertical wall portions 22 disposed outside the width direction of the engaging area 25, provided along the longitudinal direction of the fastener member 20, and extending upward from left and right side edge portions of the base portion 21, and a plurality of ear parts 24 extending outward in the left-right direction from the base portion 21.

As will be described later, the fastener member 20 is formed by melting synthetic resin for fastener that does not substantially contain magnetic particles to mold a predetermined shape, and supplying a monofilament 22a containing magnetic particles to the melted synthetic resin to integrally fix the monofilament 22a to the synthetic resin. In this case, the monofilament 22a containing magnetic particles is continuously fixed to each of the left and right vertical wall portions 22 of the fastener member 20 along the longitudinal direction while being bent in the upper-lower direction.

In the first embodiment, as the synthetic resin for fastener that is the material of the fastener member 20, for example, thermoplastic resin such as polyester resin, polyamide resin, polypropylene resin, PVC resin, ABS resin, polyethylene resin, or copolymer of them is used. As the monofilament 22a containing magnetic particles, the monofilament 22a formed by mixing magnetic particles made of metal such as iron, cobalt, or nickel or an alloy with a synthetic resin such as a polyester resin or a polyamide resin is used. Here, the magnetic particles refer to particles magnetically attracted to a magnet 73. The fastener member 20 is not limited to a synthetic resin member, and may be a woven or knitted surface fastener.

In the invention, the material of the synthetic resin for fastener, the monofilament 22a, and the magnetic particles forming the fastener member 20 is not particularly limited. In addition, instead of the monofilament 22a containing magnetic particles, a metal wire rod obtained by bundling and twisting several thin metal wires made of metal such as iron, cobalt, or nickel or an alloy can be fixed to the fastener member.

In the first embodiment, the base portion 21 is formed in a long and narrow plate shape. The upper surface (first surface) and the lower surface (second surface) of the base portion 21 are formed to be substantially flat. The base portion 21 supports the left and right vertical wall portions 22 and the plurality of engaging elements 23. The engaging elements 23 protrude from the upper surface of the base portion 21. Note that the upper surface of the base portion 21 refers to a surface of the base portion 21 facing upward other than a part where the vertical wall portions 22 and the engaging elements 23 are connected.

In the first embodiment, the term "the upper surface and the lower surface of the base portion 21 are substantially flat" includes not only completely flat surfaces but also surfaces having waviness or unevenness formed on the main surface. For example, the lower surface of the base portion 21 can be embossed to form an uneven shape, or a nonwoven fabric or a mesh-like cloth (mesh material) can be fixed to the lower surface of the base portion 21. Accordingly, when the fastener member 20 is fixed to the cushion body as described later, the fixing strength of the fastener member 20 with respect to the cushion body can be effectively increased.

The left and right vertical wall portions 22 are formed on the upper surface of the base portion 21 along the front-rear direction. One monofilament 22a containing magnetic particles as described above is vertically bent in a zigzag shape along the longitudinal direction and fixed to each of the left and right vertical wall portions 22. Each of the left and right vertical wall portions 22 includes a plurality of vertical wall main bodies provided at a constant formation pitch along the front-rear direction and supporting the monofilament 22a from below, and reinforcement ribs 22b provided on the inner side surface and the outer side surface of each vertical wall main body. Here, the inner side surface of the vertical wall main body refers to a wall surface disposed on a side facing the engaging area 25 of the vertical wall main body, and the outer side surface refers to a wall surface disposed on the opposite side of the inner side surface.

Since the monofilament 22a containing magnetic particles is continuously fixed to each of the left and right vertical wall portions 22, as will be described later, when the surface fastener 10 is attached to a die 70 used for foam-molding of the cushion body, the surface fastener 10 can be magnetically attracted to and held by the fastener attachment part of the die 70 by utilizing the magnetic force generated between the magnet 73 provided in the die 70 and the magnetic particles in the monofilament 22a fixed to each of the left and right vertical wall portions 22. Further, by utilizing the magnetic force, the self-alignment effect of the surface fastener 10 can be exerted, so that the position and direction in which the surface fastener 10 is attached can be automatically adjusted with high accuracy corresponding to the magnet 73.

In the invention, instead of fixing the monofilament 22a containing magnetic particles along the longitudinal direction, the vertical wall main body may be formed by performing two-color molding using, for example, synthetic resin containing magnetic particles together with synthetic resin for fastener forming the base portion. Even when the vertical wall main body is formed by such two-color molding, the surface fastener can be magnetically attracted to and held by the magnet 73 of the die 70. In addition, the self-alignment effect of the surface fastener can be exerted.

The reinforcement rib 22b of the vertical wall portion 22 is integrally formed on each of the inner side surface and the outer side surface of each vertical wall main body. With such a reinforcement rib 22b, the monofilament 22a can be stably fixed to the vertical wall portion 22. In the first embodiment, the reinforcement rib 22b does not have to be provided on the inner side surface or the outer side surface of the vertical wall main body. In addition, a plurality of reinforcement ribs 22b may be provided on each of the inner side surface and the outer side surface of the vertical wall main body.

Each engaging element 23 has a standing part that stands from the upper surface of the base portion 21, and a hook-shaped engagement head part (also referred to as a hook) that branches forward and backward from an upper end part of the standing portion and extends while being curved. A branch part that divides the engagement head part forward and backward is recessed downward. In addition, the engagement head part is formed to be gradually thinner and narrower toward the front hook tip and the back hook tip.

In the first embodiment, the maximum value of the height dimension (dimension in the height direction) of the engaging element 23 from the upper surface of the base portion 21 is smaller than the height dimension of the vertical wall portion 22. Here, the height dimension of the vertical wall portion 22 refers to a height dimension from the upper surface of the base portion 21 to the top end surface (upper surface) of the vertical wall portion 22. In the invention, the shape and size of the engaging elements are not particularly limited, and can be arbitrarily changed.

The plurality of engaging elements 23 is regularly arranged in the longitudinal direction and the width direction of the base portion 21 to obtain a predetermined engagement force (bonding force) with the loop member to be engaged with the fastener member 20. In the case of first embodiment, an engaging element row 26 in the longitudinal direction (vertical direction) is formed by the plurality of engaging elements 23 arranged in a line at a predetermined formation pitch along the longitudinal direction of the base portion 21.

In the fastener member 20, the engaging area 25 capable of engaging the loops of the loop member has three rows of engaging element rows 26 along the longitudinal direction, and the three rows of engaging element rows 26 are arranged in the width direction. That is, the engaging area 25 is formed in a range from the outer side surface (left side surface) of the engaging element 23 in the engaging element row 26 located on the leftmost side to the outer side surface (right side surface) of the engaging element 23 in the engaging element row 26 located on the rightmost side in the width direction. In addition, the engaging area 25 is continuously formed over substantially the entire longitudinal direction of the fastener member 20.

The plurality of engaging elements 23 is arranged in a staggered manner as a whole by shifting the positions of the engaging elements 23 in the longitudinal direction between two engaging element rows 26 adjacent to each other in the width direction. In the invention, the formation density and arrangement pattern of the engaging elements 23 are not particularly limited. For example, the number of engaging element rows 26 provided between the left and right vertical wall portions 22 may be two or more. In this case, from the viewpoint of holding force and stability when the masking member 30 is held by the fastener member 20 and the ease of peeling when the masking member 30 is peeled off from the fastener member 20, it is preferable that the engaging element rows 26 along the longitudinal direction are arranged in three rows or more and six rows or less in the width direction between the left and right vertical wall portions 22. In addition, the arrangement of the plurality of engaging elements 23 is not limited to the staggered shape as in the first embodiment, and for example, the plurality of engaging elements 23 may be aligned in the longitudinal direction and the width direction.

Each of the ear parts 24 of the fastener member 20 extends outward in the width direction from the left and right side edges of the base portion 21. In this case, the left and right side edges of the base portion 21 are positioned outside the width direction of the left and right vertical wall portions 22. The plurality of ear parts 24 arranged on the left side with respect to the base portion 21 and the plurality of ear parts 24 arranged on the right side are alternately arranged in the longitudinal direction of the base portion 21. Each of the ear parts 24 has an ear main body portion 24a extending in the width direction from the base portion 21 and a plurality of protruding wall portions 24b protruding from the upper surface of the ear main body portion 24a. The plurality of protruding wall portions 24b is provided at constant intervals along the longitudinal direction of the base portion 21.

Since the left and right ear parts 24 as described above are provided in the fastener member 20, the ear parts 24 can be embedded in the cushion body when the foam-molding of the cushion body is performed. Accordingly, the fixing strength of the surface fastener 10 (fastener member 20) with respect to the cushion body can be increased. In the invention, the shape, size, installation pattern, and the like of the ear part are not particularly limited. In addition, the fastener member may be formed without providing the ear part.

The masking member 30 of the first embodiment is formed to be narrow and long in the longitudinal direction of the fastener member 20. In addition, the masking member 30 is disposed on the upper surface of the base portion 21, covers the engaging area 25 (the plurality of engaging elements 23) of the fastener member 20 from above, and is provided between the left and right vertical wall portions 22. The masking member 30 has a width dimension larger than the engaging area 25 of the fastener member 20, and is integrally formed continuously over substantially the entire longitudinal direction of the fastener part. Further, the masking member 30 has a symmetrical shape to the left and right with reference to the center position in the width direction. In the invention, the masking member 30 may be asymmetric with reference to the center position in the width direction.

The masking member 30 of the first embodiment is made of, for example, synthetic resin or elastomer that is softer than the synthetic resin for fastener forming the fastener member 20, does not substantially contain magnetic particles, and has thermoplasticity. For example, as a material of the masking member 30, synthetic resin for masking such as PVC resin, or elastomer for masking such as polyester-based elastomer or polyurethane-based elastomer is used. By forming the masking member 30 with such a material, it is possible to make the engaging element 23 less likely to be deformed or damaged when the masking member 30 is peeled off from the fastener member 20.

The masking member 30 has a masking outer surface (masking upper surface) 31 exposed to the upper side and a masking inner surface (masking lower surface) 32 facing the base portion 21. The masking outer surface 31 and the masking inner surface 32 are disposed on opposite sides of the masking member 30. As illustrated in the cross section of the masking member 30 in FIG. 3, the masking outer surface 31 is disposed at a position lower than the top end surface of the vertical wall portion 22 of the fastener member 20 in the height direction (position close to the base portion 21), and is formed in a plane parallel to the longitudinal direction and the width direction.

The masking outer surface 31 is provided with a plurality of recess portions 34 that is disposed inward away from side edge positions in the width direction of the masking member 30 and have a shape recessed toward the base portion 21, and left and right side edge portions 33 that are disposed on left and right side edges (both end parts in the width direction) of the masking member 30, respectively. In this case, the recess portion 34 provided in the masking outer surface 31 of the first embodiment has a bottom surface part, and the bottom surface part of the recess portion 34 is disposed at a position above the engaging element 23 in the height direction, in other words, at a position farther from the base portion 21 than the upper end position of the engaging element 23.

In the invention, the recess portion 34 of the masking outer surface 31 being disposed inward away from the side edge position in the width direction of the masking member 30 means that, for example, in a plan view of the masking member 30 viewed from above, the recess portion 34 does not extend to the left and right side edges (both end parts in the width direction) of the masking member 30, and the left and right side edge portions of the masking outer surface 31 are continuously formed in the length direction as one surface. The recess portion 34 does not include a recess portion due to deflection of a flexible article.

In the first embodiment, the recess portions 34 provided in the masking outer surface 31 have four vertical groove portions (recessed groove portions in vertical direction) 35 provided along the longitudinal direction. Each of the vertical groove portions 35 is linearly formed along the longitudinal direction. Each of the vertical groove portions 35 has a groove bottom surface and a pair of left and right groove wall surfaces rising from left and right side edges of the groove bottom surface, and a quadrangular or substantially quadrangular space portion is formed inside the vertical groove portion 35 when a transverse cross section orthogonal to the longitudinal direction of the masking member 30 is viewed (see FIG. 3). In this case, as described above, the groove bottom surface (bottom surface part) of each vertical groove portion 35 is provided at a position higher than the upper end position of the engaging element 23.

In addition, the vertical groove portion 35 of the first embodiment has two types of vertical groove portions 35 having different groove depths from the position of the masking outer surface 31 to the groove bottom surface. Specifically, the vertical groove portions 35 include two first vertical groove portions 35a disposed at positions closer to the center in the width direction, and two second vertical groove portions 35b disposed on the left and right sides of the first vertical groove portions 35a, and the first vertical groove portions 35a are formed to have a larger groove depth than the second vertical groove portions 35b.

By providing the first vertical groove portions 35a having a large groove depth as described above, the foam resin that has intruded the inside beyond the vertical wall portions 22 can be accommodated and held in the deep first vertical groove portions 35a at the time of foam-molding of the cushion body described later. Therefore, the fixing strength of the masking member 30 for fixing the foam body can be increased. In addition, by forming the second vertical groove portions 35b shallower than the first vertical groove portions 35a, the strength of the both left and right end parts in the width direction of the masking member 30 can be increased, and the shape (transverse cross-sectional shape) of the masking member 30 can be stabilized.

In addition, the first vertical groove portions 35a and the second vertical groove portions 35b in the first embodiment are preferably formed at positions not overlapping the engaging element row 26 along the longitudinal direction in the width direction. That is, the two first vertical groove portions 35a are provided in a range between the engaging element row 26 arranged at the center in the width direction of the fastener member 20 and the engaging element rows 26 arranged on both left and right sides. The two second vertical groove portions 35b are provided in a range between the left and right engaging element rows 26 and the left and right vertical wall portions 22.

Thus, as will be described later, in the manufacturing process of the surface fastener 10, when the fastener member 20 and the masking member 30 are attached, it is possible to suppress application of a load to the engaging elements 23 due to a formation of the vertical groove portions 35. This makes it difficult to cause deformation such as bending of the engaging elements 23. Further, it is possible to suppress a local decrease in the strength of the masking member 30 due to the installation of the first vertical groove portions 35a and the second vertical groove portions 35b.

The height of each of the left and right side edge portions 33 of the masking member 30 is highest in the masking outer surface 31, and the left and right side edge portions 33 are provided adjacent to the inside of the left and right vertical wall portions 22 of the fastener member 20 along the longitudinal direction of the fastener member 20. The upper surface of the side edge portion 33 is disposed farthest from the base portion 21 in the height direction in the masking member 30, and is disposed at a position lower than the top end surface of the vertical wall portion 22 of the fastener member 20 in the height direction. Since left and right side edge portions 33 are provided, strength at both left and right end parts of the masking member 30 can be improved. In addition, it is possible to make it difficult for the foam resin to intrude the inside of the side edge portions 33 at the time of foam-molding of the cushion body.

In the surface fastener 10 of the first embodiment, the masking outer surface 31 of the masking member 30 is arranged lower than the top end surface of the vertical wall portion 22 of the fastener member 20. Accordingly, in the foam-molding process of the cushion body, when the surface fastener 10 is held in the molding die 70 using the above-described self-alignment effect, the frictional force generated between the surface fastener 10 and the inner surface of the die 70 can be reduced, and the surface fastener 10 can be easily moved with respect to the die 70. As a result, the position and direction of the surface fastener 10 can be accurately and smoothly adjusted corresponding to the position and direction of the magnet 73 installed in the die 70. In the first embodiment, the side edge portion 33 of the masking outer surface 31 may be formed as an inclined surface inclined downward from the vertical wall portion 22 of the fastener member 20 toward the masking outer surface 31.

The masking inner surface 32 of the masking member 30 is disposed away from the base portion 21, and is formed into an uneven surface that changes the separation distance from the base portion 21 when the transverse cross section of the masking member 30 is viewed (see FIG. 3). Such a cross-sectional shape of the masking inner surface 32 is formed over the entire length direction of the masking member 30. Therefore, a space portion 36 is provided between the upper surface of the base portion 21 and the masking inner surface 32 of the masking member 30. Accordingly, when the masking member 30 is peeled off and removed from the fastener member 20, the masking member 30 can be more easily peeled off.

The masking inner surface 32 is provided with two recessed inner groove portions 37 extending toward the masking outer surface 31. In this case, the two inner groove portions 37 are provided corresponding to the positions of the left and right engaging element rows 26 of the three engaging element rows 26 of the fastener member 20. Thus, since the depth at which each of the engaging elements 23 in the left and right engaging element rows 26 is embedded in the masking member 30 can be reduced, the masking member 30 can be easily peeled off from the fastener member 20. On the other hand, the engaging elements 23 of the engaging element row 26 arranged at the central part in the width direction of the fastener member 20 are embedded deeper in the masking member 30 than the left and right engaging element rows 26. Thus, the force with which the fastener member 20 holds the masking member 30 can be increased.

Next, a manufacturing apparatus and a manufacturing method for manufacturing the surface fastener 10 of the first embodiment as described above will be described.

Figure 5:
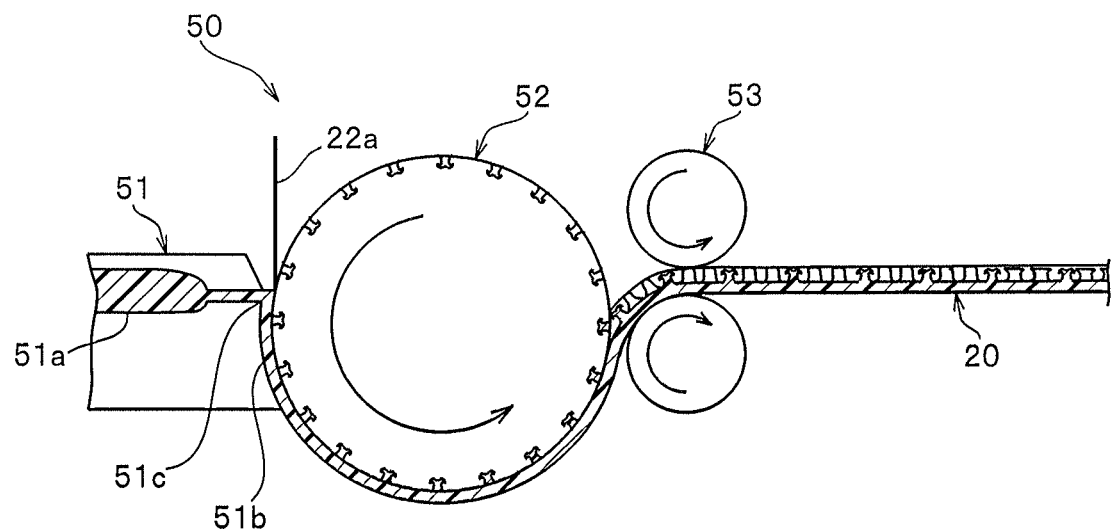
FIG. 5 is a schematic view schematically illustrating a first molding apparatus used for manufacturing the surface fastener illustrated in FIG. 1.
Figure 6:
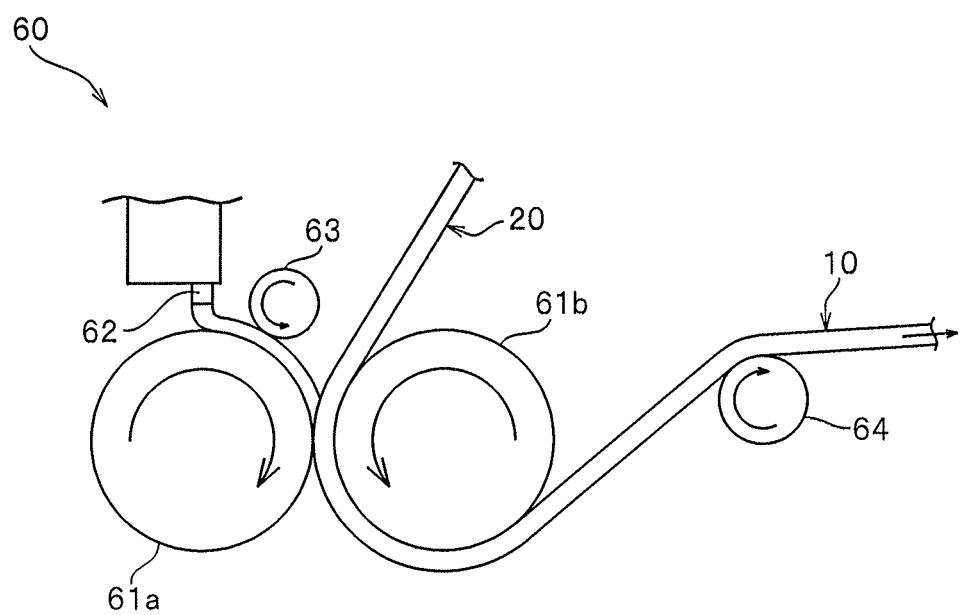
FIG. 6 is a schematic view schematically illustrating a second molding apparatus used for manufacturing the surface fastener illustrated in FIG. 1.

The manufacturing apparatus of the first embodiment includes a first molding apparatus 50 used for molding the fastener member 20 as illustrated in FIG. 5, and a second molding apparatus 60 used for molding and attaching the masking member 30 to the fastener member 20 as illustrated in FIG. 6.

The first molding apparatus 50 of FIG. 5 includes a die wheel 52 that is driven and rotated in one direction (counterclockwise direction in the drawing), a first nozzle portion 51 that is disposed to face the outer peripheral surface of the die wheel 52 and supplies a melted synthetic resin for fastener, a monofilament supply part (not illustrated) that introduces the monofilament 22a containing magnetic particles between the die wheel 52 and a resin supply port 51c of the first nozzle portion 51, and a pickup roller 53 disposed on the downstream side (front side in the machine direction) in the rotation direction of the die wheel 52 with respect to the first nozzle portion 51.

The die wheel 52 of the first molding apparatus 50 is formed in a columnar shape. Although not illustrated, the die wheel 52 includes a plurality of laminated plates formed in a ring shape or a doughnut shape having a required thickness, and a rotation shaft part inserted into the central opening of the plurality of laminated plates overlapped with each other and fixing the laminated plates.

In addition, on the outer peripheral surface part (that is, the outer peripheral edge part of the laminated plates) of the die wheel 52, a molding cavity (not illustrated) for molding the vertical wall portion 22, the engaging element 23, and the protruding wall portion 24b of the ear part 24 in the fastener member 20 is formed using a conventionally known technique such as electrical discharge machining, laser machining, or etching.

Further, the die wheel 52 is formed in a manner that a cooling liquid can flow through the inside of the die wheel 52 in order to efficiently cool the fastener member 20 molded on the outer peripheral surface part. A cooling liquid tank (not illustrated) for immersing the lower half part of the die wheel 52 is disposed at the lower portion of the die wheel 52.

As illustrated in FIG. 5, the first nozzle portion 51 is provided with a flow path portion 51a through which the synthetic resin for fastener forming the fastener member 20 is flowed in a melted state, a wheel facing surface 51b disposed facing the outer peripheral surface of the die wheel 52, and a resin supply port 51c provided on the wheel facing surface 51b and through which the synthetic resin for fastener in a melted state flows out from the flow path portion 51a. A constant interval corresponding to the thickness of the base portion 21 of the fastener member 20 is provided between the wheel facing surface 51b of the first nozzle portion 51 and the curved outer peripheral surface of the die wheel 52.

The pickup roller 53 includes a pair of an upper clamping roller and a lower clamping roller that clamps the fastener member 20 molded on the outer peripheral surface of the die wheel 52 from above and below. The upper clamping roller and the lower clamping roller of the pickup roller 53 are arranged to face each other at a predetermined interval. By the pickup roller 53, the fastener member 20 molded on the outer peripheral surface part of the die wheel 52 can be continuously peeled off from the die wheel 52, and the peeled fastener member 20 can be transferred to the downstream side while being sandwiched between the upper clamping roller and the lower clamping roller.

The second molding apparatus 60 of FIG. 6 includes a pair of left and right attaching rollers 61a and 61b, a second nozzle portion 62 that supplies synthetic resin for masking (or elastomer for masking) in a melted state, a molding roller (masking roller) 63 that imparts a predetermined shape to the synthetic resin for masking supplied to the left attaching roller 61a, a fastener supply part (not illustrated) that supplies the fastener member 20 toward the right attaching roller 61b, and a conveying roller 64 that feeds the fastener member 20 passing between the left and right attaching rollers 61a and 61b to the downstream side.

The left attaching roller 61a and the right attaching roller 61b are rotatably arranged with a predetermined interval between both rollers. In this case, the left attaching roller 61a and the right attaching roller 61b are installed to rotate in opposite directions to each other. In the first embodiment, since the right attaching roller 61b supports the fastener member 20 from the lower surface side of the base portion 21, the outer peripheral surface is formed to be flat.

Figure 7:
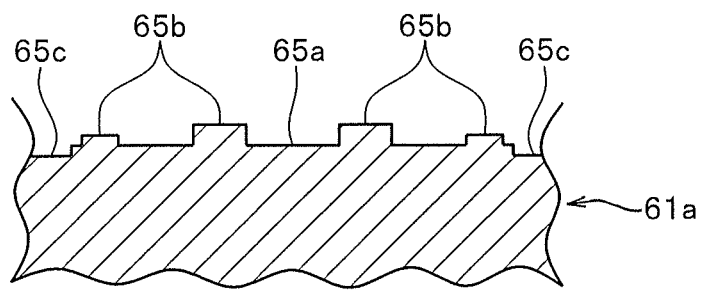
FIG. 7 is a cross-sectional view illustrating a main part of a attaching roller of the second molding apparatus illustrated in FIG. 6.

On the other hand, the outer peripheral surface of the left attaching roller 61a is formed in a shape as illustrated in FIG. 7 in order to impart the shape of the vertical groove portion 35 provided on the masking outer surface 31 of the masking member 30 to the synthetic resin for masking supplied from the second nozzle portion 62. Specifically, on the outer peripheral surface of the left attaching roller 61a, a first outer peripheral surface 65a forming the masking outer surface 31 of the masking member 30, four protruding portions 65b protruding outward in the radial direction of the attaching roller 61a from the first outer peripheral surface 65a, and a second outer peripheral surface 65c disposed on both left and right sides of the first outer peripheral surface 65a and formed at a position lower than the first outer peripheral surface 65a (a position inside in the radial direction) are provided along the machine direction (MD).

Since the outer peripheral surface of the left attaching roller 61a is formed as described above, the shapes of the masking outer surface 31, the vertical groove portion 35, and the side edge portion 33 of the masking member 30 can be imparted to the synthetic resin for masking supplied from the second nozzle portion 62 by the first outer peripheral surface 65a, the protruding portions 65b, and the second outer peripheral surface 65c before the synthetic resin is attached to the fastener member 20.

The second nozzle portion 62 of the second molding apparatus 60 is provided to be able to supply the synthetic resin for masking to the outer peripheral surface of the left attaching roller 61a.

The molding roller 63 is disposed between the position of the second nozzle portion 62 and the position where the left and right attaching rollers 61a and 61b are closest to each other, and is disposed at constant intervals with respect to the left attaching roller 61a. When the masking member 30 is attached to the fastener member 20, the outer peripheral surface of the molding roller 63 is formed as an uneven surface being capable of forming the masking inner surface 32 of the masking member 30 into a predetermined surface shape illustrated in FIG. 3.

In the first embodiment, a cutting apparatus (not illustrated) is disposed on the downstream side of the second molding apparatus 60. The cutting apparatus (not illustrated) includes a cutter part that can be moved up and down in the upper-lower direction. In this cutting apparatus, by lowering the cutter part toward the conveyed surface fastener 10, a part of the fastener member 20 can be punched out to form the left and right ear parts 24 on the fastener member 20.

In the case of manufacturing the surface fastener 10 of the first embodiment using the manufacturing apparatus as described above, first, the fastener member 20 in a state before the ear parts 24 are formed is manufactured by the first molding apparatus 50. In the manufacturing process of the fastener member 20 by the first molding apparatus 50, the melted synthetic resin for fastener is continuously flowed out from the first nozzle portion 51 and supplied to the die wheel 52. At the same time, the monofilament 22a containing magnetic particles is introduced between the outer peripheral surface of the die wheel 52 and the first nozzle portion 51 from the monofilament supply part (not illustrated).

Thus, the base portion 21 of the fastener member 20 is molded between the first nozzle portion 51 and the die wheel 52. In addition, the left and right vertical wall portions 22, the engaging elements 23, and the protruding wall portions 24b of the ear parts 24 in the fastener member 20 are molded by the cavities provided in the outer peripheral surface portion of the die wheel 52, and the monofilament 22a is fixed to the left and right vertical wall portions 22.

Accordingly, the fastener member 20 not provided with the ear parts 24 can be continuously formed along the machine direction (MD) on the outer peripheral surface part of the die wheel 52. At this time, the fastener member 20 to be molded is cooled by half rotating while being carried on the outer peripheral surface part of the die wheel 52. After that, the fastener member 20 is continuously peeled off from the die wheel 52 by the pickup roller 53 and fed toward the second molding apparatus 60.

Next, in the second molding apparatus 60, a process of supplying the synthetic resin for masking in a melted state to the left attaching roller 61a and attaching the synthetic resin for masking to the fastener member 20 manufactured by the first molding apparatus 50 by the left and right attaching rollers 61a and 61b is performed.

First, in the second molding apparatus 60, the synthetic resin for masking is supplied from the second nozzle portion 62 toward the outer peripheral surface of the left attaching roller 61a in a melted state. At the same time, the fastener member 20 molded by the first molding apparatus 50 is supplied from the fastener supply part (not illustrated) toward the right attaching roller 61b. At this time, as illustrated in FIG. 7, the first outer peripheral surface 65a, the protruding portions 65b, and the second outer peripheral surface 65c are provided on the outer peripheral surface of the left attaching roller 61a. Thus, the shape of the outer peripheral surface of the attaching roller 61a is transferred to the synthetic resin for masking supplied to the left attaching roller 61a. As a result, the shapes of the masking outer surface 31, the vertical groove portions 35, and the side edge portions 33 of the masking member 30 are formed.

Subsequently, by bringing the synthetic resin for masking supplied to the left attaching roller 61a into contact with the rotating molding roller 63, a shape capable of forming the masking inner surface 32 of the masking member 30 is imparted to a surface of the synthetic resin for masking opposite to a surface in contact with the attaching roller 61a.

After that, on the downstream side of the molding roller 63, the synthetic resin for masking to which the shapes of the masking outer surface 31 and the masking inner surface 32 are imparted is pressed against the fastener member 20 supplied to the right attaching roller 61b and bonded in a melted state by the left and right attaching rollers 61a and 61b. At this time, a part of each engaging element 23 of the fastener member 20 is embedded in the synthetic resin for masking, and the space portion 36 is provided between the base portion 21 of the fastener member 20 and the synthetic resin for masking.

After the synthetic resin for masking is attached to the fastener member 20 by the left and right attaching rollers 61a and 61b, the fastener member 20 is conveyed in the rotation direction by the right attaching roller 61b and further fed to the downstream side by the conveying roller 64. At this time, the synthetic resin for masking attached to the fastener member 20 is cured to form the masking member 30.

After that, the fastener member 20 to which the masking member 30 is attached by the second molding apparatus 60 is conveyed toward a cutting apparatus (not illustrated), and a cutting process of partially punching out a part of the fastener member 20 is performed by the cutter part of the cutting apparatus. Thus, the left and right ear parts 24 are formed on the fastener member 20. Further, in the cutting apparatus, the surface fastener 10 on which the ear parts 24 are formed can be cut into a predetermined length. Accordingly, the surface fastener 10 of the first embodiment illustrated in FIG. 1 is manufactured.

In the surface fastener 10 of the first embodiment manufactured by the manufacturing method as described above, the masking member 30 is detachably held by the fastener member 20, and the engaging area 25 of the fastener member 20 is covered with the masking member 30. The masking outer surface 31 of the masking member 30 is provided with the plurality of vertical groove portions 35.

The surface fastener 10 of the first embodiment as described above is integrally fixed at a predetermined position of a cushion body to be molded, for example, when a cushion body (foam body) such as a seat for an automobile is subjected to foam-molding. Here, foam-molding of the cushion body integrating the surface fastener 10 will be briefly described.

Figure 8:
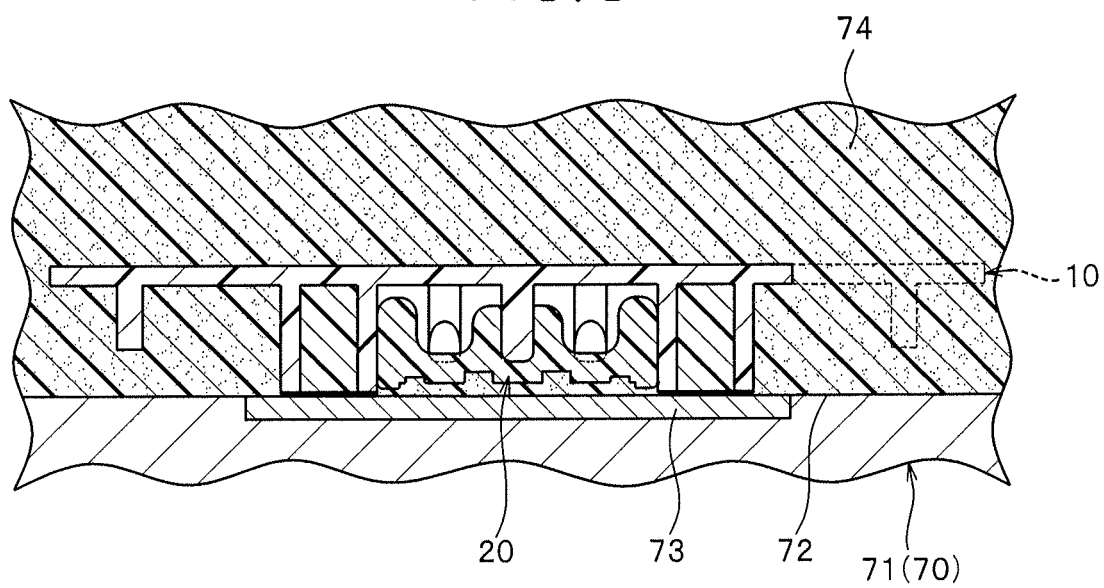
FIG. 8 is a schematic view illustrating a foam body formed between the surface fastener and a die by foam-molding.

The die 70 used for foam-molding of the cushion body includes, for example, a lower die (fixed die) 71 partially illustrated in FIG. 8, an upper die (movable die) (not illustrated) disposed to be movable up and down with respect to the lower die 71, and an injection nozzle (not illustrated) that injects foam resin 74 into a cavity space in the upper die and the lower die 71. In addition, at least one fastener holding portion 72 for placing and holding the surface fastener 10 is provided in the lower die 71 of the die 70. Inside or in the vicinity of the fastener holding portion 72, the magnet 73 capable of attracting magnetic particles in the monofilament 22a fixed to the vertical wall portion 22 of the surface fastener 10 is embedded. In the invention, the shape and structure of the molding die 70 are not limited, and can be arbitrarily changed.

When the foam-molding of the cushion body is performed using such a die 70, first, the surface fastener 10 is placed on the fastener holding portion 72 of the die 70 in a direction in which the masking member 30 faces the cavity surface of the die 70. At this time, the magnetic particles in the monofilament 22a are magnetically attracted by the magnet 73 of the die 70. Thus, the surface fastener 10 is held by the fastener holding portion 72. In the surface fastener 10 of the first embodiment, the vertical wall portions 22 of the fastener member 20 are disposed at a position higher than the masking outer surface 31 of the masking member 30 in the height direction. Therefore, when the surface fastener 10 is held by the fastener holding portion 72 of the die 70, the top end surface of the vertical wall portion 22 of the fastener member 20 can be easily brought into close contact with the attachment surface of the fastener holding portion 72.

In addition, since the masking outer surface 31 of the masking member 30 is disposed at a position lower than the top end surface of the vertical wall portion 22, the masking outer surface 31 can be separated from the attachment surface of the fastener holding portion 72 of the die 70 when the surface fastener 10 is held by the fastener holding portion 72 of the die 70. Thus, when the position and direction of the surface fastener 10 are automatically adjusted using the self-alignment effect of the surface fastener 10 by the magnetic force, frictional resistance generated between the surface fastener 10 and the fastener holding portion 72 of the die 70 can be reduced, so that the surface fastener 10 can be easily moved with respect to the fastener holding portion 72 of the die 70. As a result, the position and direction of the surface fastener 10 can be accurately and smoothly adjusted corresponding to the position and direction of the magnet 73 arranged in the fastener holding portion 72 of the die 70.

Subsequently, the foam resin 74 of the cushion body is injected into the cavity space from the injection nozzle of the die 70. Accordingly, the foam resin 74 flows while foaming, and foam-molding of the cushion body (foam body) is performed, thereby the cushion body (main body part of the foam body) having a predetermined shape is formed in the cavity space of the die 70.

At this time, as schematically illustrated in FIG. 8, the foam resin 74 may enter the inside of the left and right vertical wall portions 22 beyond the left and right vertical wall portions 22 of the fastener member 20, and a thin part of the foam body may be continuously formed from the main body part of the foam body between the masking member 30 and the die 70 by such entry of the foam resin 74. In this case, in the surface fastener 10 of the first embodiment, since the masking member 30 covers the engaging area 25 of the fastener member 20 between the left and right vertical wall portions 22 of the fastener member 20, the foam resin 74 can be prevented from intruding between the plurality of engaging elements 23 of the fastener member 20.

In addition, the foam resin 74 that has entered the inside of left and right vertical wall portions 22 enters and is accommodated in four vertical groove portions 35 provided on the masking outer surface 31 of the masking member 30. By accommodating and curing the foam resin 74 in the vertical groove portions 35 of the masking outer surface 31 in this manner, a fixing area between the thin part of the foam body and the masking member 30 can be increased, and the thin part can be hooked by the vertical groove portions 35, making it difficult to peel off the thin part from the masking member 30.

That is, in the surface fastener 10 of the first embodiment, since the masking member 30 is provided with the four vertical groove portions 35 (recess portions 34), the fixing strength between the masking member 30 and the foam body can be effectively increased. In this case, the fixing strength between the masking member 30 and the foam body can be rephrased as a holding force for holding the foam body of the masking member 30. Thus, the thin part of the foam body can be firmly held on the masking outer surface 31 of the masking member 30.

Further, in the first embodiment, the left and right side edge portions 33 are provided on the masking outer surface 31 of the masking member 30. Thus, the foam body formed between the left and right side edge portions 33 of the masking member 30 and the die 70 can be partially further thinned in the width direction to form the extremely thin portion. That is, in the first embodiment, the extremely thin portion formed by the side edge portions 33 is provided between the main body part and the thin part of the foam body. In addition, such an extremely thin portion of the foam body can be continuously formed along the longitudinal direction of the surface fastener 10.

Then, the foam-molding is completed in the die 70, thereby the cushion body in which the surface fastener 10 is integrated with a necessary portion is manufactured. At this time, the masking member 30 is attached to the fastener member 20 of the surface fastener 10. Therefore, the plurality of engaging elements 23 of the fastener member 20 can be exposed to the outside by peeling off and removing the masking member 30 from the fastener member 20 after the end of the foam-molding.

In addition, in the first embodiment, since the vertical groove portions 35 and the side edge portions 33 are provided on the masking outer surface 31 of the masking member 30, the thin part of the foam body formed between the masking member 30 and the die 70 is firmly held by the masking member 30 as described above, and the extremely thin portion is formed between the thin part and the main body part of the foam body. Further, in this case, a step is provided between the masking outer surface 31 and the upper surface of the side edge portion 33 in the masking member 30, and a step is also provided between the upper surface of the side edge portion 33 and the upper surface of the vertical wall portion 22 (see FIG. 3). Therefore, a step is also formed between the thin part and the extremely thin portion of the foam body, and a step for further reducing the thickness is also formed outside the extremely thin portion.

Thus, when the masking member 30 is peeled off from the fastener member 20 after the foam-molding is completed, the thin part of the foam body is pulled without being peeled off from the masking member 30. As a result, the extremely thin portion of the foam body or the vicinity can be easily cut. Therefore, the thin part of the foam body can be separated and removed from the main body part without damaging the main body part of the foam body.

As described above, in the first embodiment, since the thin part of the foam body formed on the masking outer surface 31 of the masking member 30 can be easily and stably removed, the thin part of the foam body can be prevented from covering the engaging area 25 of the fastener member 20, and the plurality of engaging elements 23 in the fastener member 20 integrated with the cushion body can be directly exposed to the surface side of the cushion body. Thus, in the fastener member 20 of the first embodiment, it is possible to suppress a decrease in the engagement strength and to stably exert the engagement force originally possessed by the engaging area 25.

Therefore, when the surface of the obtained cushion body is covered with the skin member, the loops of the loop member provided on the back surface of the skin member can be stably engaged with the engaging element 23 of the fastener member 20. In addition, since the skin member can be stably attached without floating from the cushion body, the skin member can be accurately attached to the surface of the cushion body. Further, since the surface fastener 10 is firmly fixed to the cushion body, a state in which the skin member is attached to the cushion body can be stably maintained.

In the masking member 30 of the surface fastener 10 of the first embodiment, four vertical groove portions 35 are provided on the masking outer surface 31 as the recess portions 34 for increasing the fixing strength between the masking member 30 and the foam body. However, in the invention, the number of vertical groove portions provided on the masking outer surface is not particularly limited, and only one vertical groove portion may be provided on the masking outer surface, or three or less or five or more plurality of vertical groove portions may be provided.

In the invention, the form of the recess portions 34 provided on the masking outer surface 31 is not limited to the vertical groove portions 35 of the first embodiment described above, and a recess portion having another form such as the forms illustrated in FIGS. 9 to 14 may be provided on the masking outer surface. Here, FIGS. 9 to 14 are schematic views illustrating masking members 30a, 30b, 30c, 30d, and 30e according to the first to fifth modified examples that can be detachably provided on the fastener member 20 instead of the masking member 30 of the first embodiment.

For example, in the masking members 30a, 30b, and 30c illustrated in the first modified example to the third modified example, structures and shapes other than the recess portion are formed substantially similar to those of the masking member 30 of the first embodiment described above. Therefore, portions or members having substantially the same configurations as those of the masking member 30 of the first embodiment described above are denoted by the same reference signs, and the description thereof will be omitted. In the sixth to ninth modified examples, the third embodiment, and its first modified example, which will be described later, portions or members having substantially the same configurations as those of the surface fastener 10 of the first embodiment described above are denoted by the same reference signs, and the description thereof will be omitted.

Figure 9:
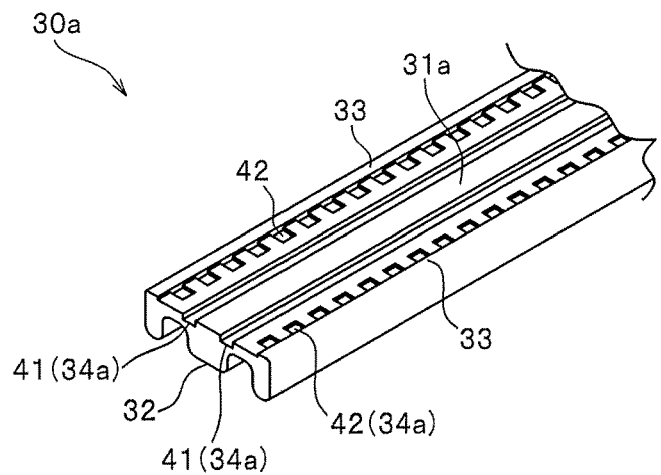
FIG. 9 is a perspective view schematically illustrating a masking member according to a first modified example of the first embodiment.

For example, as illustrated in FIG. 9, a masking outer surface 31a of the masking member 30a according to the first modified example is provided with a plurality of recess portions 34a each having a bottom surface part, and left and right side edge portions 33. In addition, the recess portions 34a of the first modified example has two vertical groove portions 41 provided along the longitudinal direction and a plurality of depressed portions 42 provided intermittently along the longitudinal direction.

In this case, the vertical groove portions 41 in the first modified example are formed in the same manner as the first vertical groove portions 35a in the first embodiment described above. The plurality of depressed portions 42 in the first modified example are intermittently provided along the length direction at respective parts on the left side and the right side of the two vertical groove portions 41 in the width direction. In this case, each of the depressed portions 42 is formed adjacent to the side edge portion 33.

Since the depressed portions 42 as described above are provided along the length direction, as compared with the vertical groove portions 41 along the length direction, it is possible to secure a wide fixing area between the foam body and the masking member 30a and to more easily hook the foam body to the masking member 30a. Therefore, the holding force of the foam body by the masking member 30a can be further increased.

Since the plurality of depressed portions 42 is provided adjacent to the left and right side edge portions 33, a step larger than a step between the upper surface of the side edge portion 33 and the masking outer surface 31a is formed between the upper surface of the side edge portion 33 and the bottom surface of the depressed portions 42. Thus, when the masking member 30a is peeled off from the fastener member 20, the extremely thin portion of the foam body or the vicinity can be more easily cut.

Therefore, in the surface fastener having the masking member 30a of the first modified example, as described in the above first embodiment, by peeling off the masking member 30a from the fastener member 20 after the foam-molding of the cushion body, a thin part of the foam body formed between the masking member 30a and the die 70 can be easily removed, thus the similar effect as that of the surface fastener 10 of the above-described first embodiment can be obtained.

Further, in the case of the first modified example, since the foam body can be strongly fixed by the plurality of depressed portions 42 adjacent to the left and right side edge portions 33, for example, even when the foam resin enters from one of the left and right sides to form the foam body, the foam body can be firmly held by the plurality of depressed portions 42 provided on the one side. Therefore, for example, even when the foam body is formed on one of the left and right sides on the masking member 30a, the foam body can be easily removed by peeling off the masking member 30a from the fastener member 20.

Figure 10:
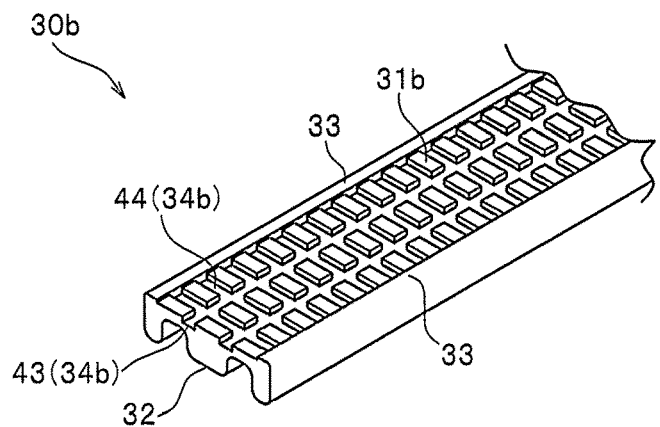
FIG. 10 is a perspective view schematically illustrating a masking member according to a second modified example of the first embodiment.

FIG. 10 illustrates the masking member 30b according to a second modified example. In the masking member 30b according to the second modified example, recess portions 34b provided on a masking outer surface 31b has two vertical groove portions 43 provided along the longitudinal direction and a plurality of lateral groove portions 44 provided along the width direction. In other words, on the masking outer surface 31b of the second modified example, a plurality of recessed groove portions is arranged in a lattice shape along the longitudinal direction and the width direction.

In the masking member 30b of the second modified example having the vertical groove portions 43 and the lateral groove portions 44 as described above, since the foam bodies that enter and are accommodated in the vertical groove portions 43 and the lateral groove portions 44 can be connected to each other, the holding force of the foam body by the masking member 30b can be more effectively increased. Therefore, also in the surface fastener having the masking member 30b of the second modified example, the similar effect as that of the surface fastener 10 of the first embodiment described above can be obtained. Further, in the masking member 30b of the second modified example, since vertical groove portions 43 and lateral groove portions 44 are provided, the flexibility of the masking member 30b in the longitudinal direction and the width direction can be improved. Accordingly, the masking member 30b can be more easily peeled off from the fastener member 20.

Figure 11:
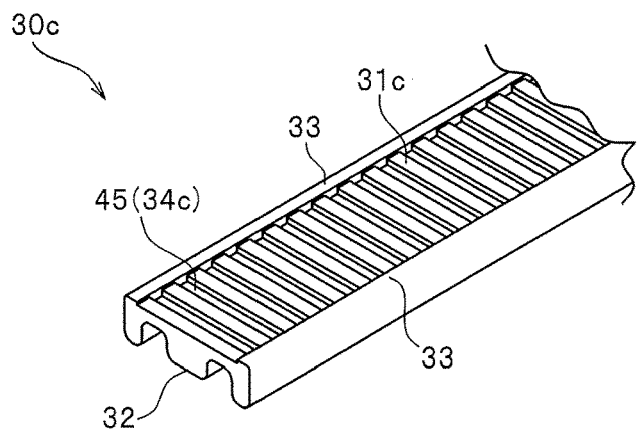
FIG. 11 is a perspective view schematically illustrating a masking member according to a third modified example of the first embodiment.

FIG. 11 illustrates the masking member 30c according to a third modified example. In the masking member 30c according to the third modified example, recess portions 34c provided on a masking outer surface 31c have a plurality of lateral groove portions 45 provided along the width direction. In this case, each of the lateral groove portions 45 is continuously formed between the left and right side edge portions 33.

In the masking member 30c of the third modified example having such lateral groove portions 45, for example, as compared with the surface fastener 10 of the first embodiment described above, it is possible to secure a wide fixing area between the foam body and the masking member 30c and to more easily hook the foam body to the masking member 30c. Therefore, also in the surface fastener having the masking member 30c of the third modified example, the similar effect as that of the surface fastener 10 of the first embodiment described above can be obtained.

Further, in the masking member 30c of the third modified example, since the lateral groove portions 45 are provided, the flexibility of the masking member 30c in the longitudinal direction can be improved. In the case of the third modified example, since a part of the foam body is accommodated in the lateral groove portions 45, when the masking member 30c is peeled off from the fastener member 20, it is difficult to cut the foam body formed inside the left and right side edge portions 33 of the masking member 30c in the longitudinal direction. Therefore, the foam body can be stably cut at the above-described extremely thin portion.

Figure 12:
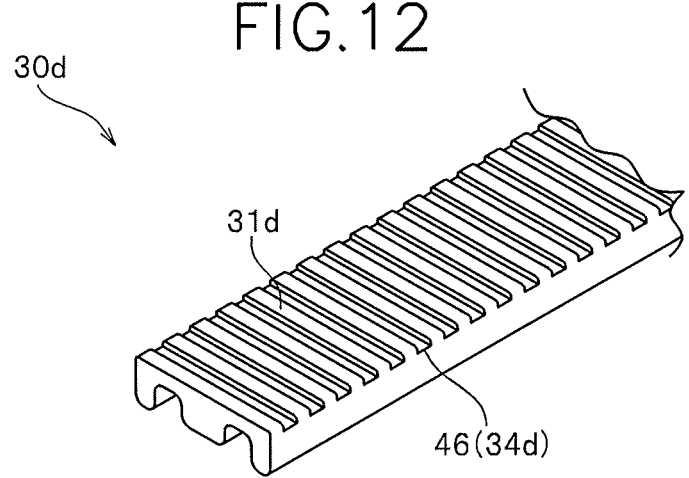
FIG. 12 is a perspective view schematically illustrating a masking member according to a fourth modified example of the first embodiment.

FIG. 12 illustrates the masking member 30d according to a fourth modified example. In the masking member 30d according to the fourth modified example, recess portions 34d provided on a masking outer surface 31d include a plurality of lateral groove portions 46 continuously provided along the width direction to include end parts in the width direction of the masking outer surface 31d. In the surface fastener including the masking member 30d of the fourth modified example, the similar effect as that of the first embodiment can be obtained. In the fourth modified example, the flexibility of the masking member 30d in the longitudinal direction can be further improved as compared with the third modified example.

Figure 13:
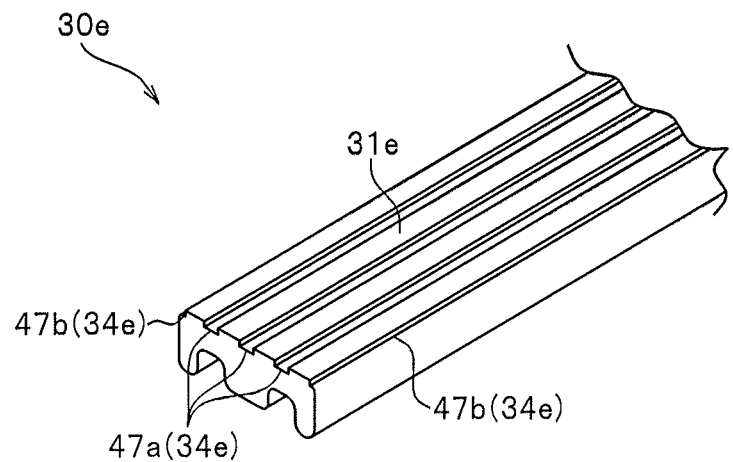
FIG. 13 is a perspective view schematically illustrating a masking member according to a fifth modified example of the first embodiment.
Figure 14:
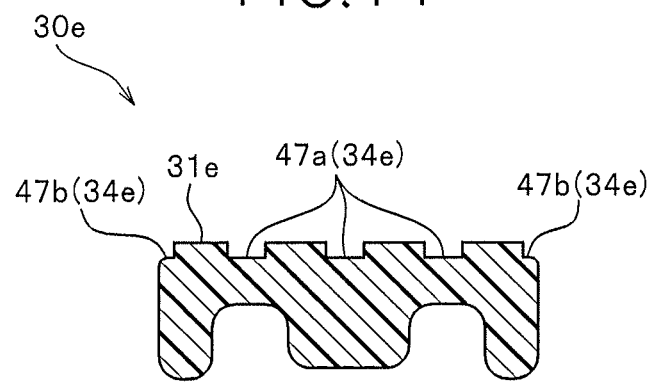
FIG. 14 is a cross-sectional view of the masking member illustrated in FIG. 13.

FIGS. 13 and 14 illustrate the masking member 30e according to a fifth modified example. In the masking member 30e according to the fifth modified example, recess portions 34e provided on a masking outer surface 31e include a plurality of first vertical groove portions 47a provided inward away from the side edge positions in the width direction of the masking member 30e, and left and right second vertical groove portions 47b provided at both end parts in the width direction of masking outer surface 31e. In this case, the left and right second vertical groove portions 47b are provided at both end parts in the width direction of the masking outer surface to cut out the entire longitudinal direction of the fastener member along the longitudinal direction of the fastener member.

In the surface fastener including the masking member 30e of the fifth modified example, the similar effect as that of the first embodiment can be obtained. In the fifth modified example, since the foam body can be easily hooked at both end parts in the width direction of the masking outer surface 31e, the foam body can be easily peeled off from the fastener member.

Figure 15:
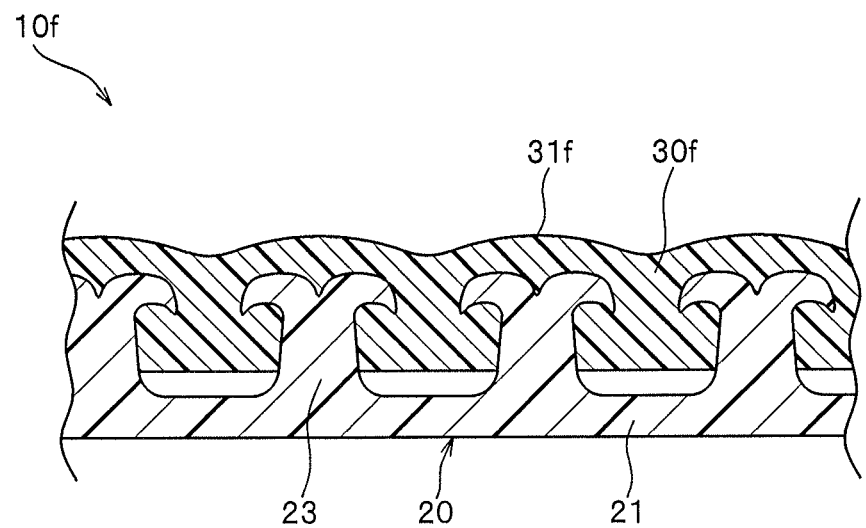
FIG. 15 is a cross-sectional view schematically illustrating a cross section of a surface fastener according to a sixth modified example of the first embodiment.

In the surface fastener 10 of the first embodiment described above, the masking outer surface 31 of the masking member 30 is formed in a plane surface parallel to the longitudinal direction and the width direction. However, in the invention, for example, as FIG. 15 illustrates a cross section along the longitudinal direction of a surface fastener 10f according to a sixth modified example, a masking outer surface 31f of a masking member 30f may be formed as a corrugated surface that undulates up and down along the longitudinal direction.

In the sixth modified example, in the second molding apparatus 60 illustrated in FIG. 6, for example, by changing the magnitude of the pressure when the synthetic resin for masking is attached to the fastener member 20 with the left and right attaching rollers 61a and 61b and the like, the masking outer surface 31f of the masking member 30f can be formed on the above-described corrugated surface.

In this case, the undulation of the masking outer surface 31f in the upper-lower direction is formed corresponding to the positions of the engaging elements 23 of the fastener member 20. That is, in the longitudinal direction, the masking outer surface 31f is formed high to rise in a range where each of the engaging elements 23 is formed, and formed low to be recessed in a range of each of the space portions between the engaging elements 23.

As in the surface fastener 10f of the sixth modified example, the masking outer surface 31f of the masking member 30f is formed on the surface that undulates up and down along the longitudinal direction. Thus, the effect (that is, the anchor effect) of fixing the thin foam body formed on the masking member 30f during the foam-molding of the cushion body to the masking outer surface 31f can be enhanced as compared with the case where the masking outer surface 31 is formed in a plane surface as in the first embodiment described above.

Note that the above-described "vertical groove portion", "depressed portion", and "lateral groove portion" are one form of the shape of the recess portion. In the invention, the shape of the recess portion is not particularly limited as long as the recess portion is formed to be recessed from the masking outer surface.

Second Embodiment

A surface fastener of a second embodiment is a curve-compatible surface fastener applied in a case where the surface fastener is integrated with the cushion body in a state of being curved in the width direction, for example, from the viewpoint of the use of the cushion body, the design of the product, and the like. The surface fastener of the second embodiment is formed by cutting a part of the surface fastener 10 of the first embodiment. Thus, the curve-compatible surface fastener has a plurality of fastener engagement parts disposed along the longitudinal direction and connecting portions having flexibility for connecting the fastener engagement parts adjacent in the longitudinal direction.

According to such a surface fastener of the second embodiment, even when the fastener holding portion provided in the molding die of the cushion body has a complicated shape such as a greatly bent shape or a twisted shape, the surface fastener of the second embodiment can be easily attached along the fastener holding portion using magnetic force. In addition, the above-described self-alignment effect of the surface fastener can be effectively exerted.

Third Embodiment

Figure 16:
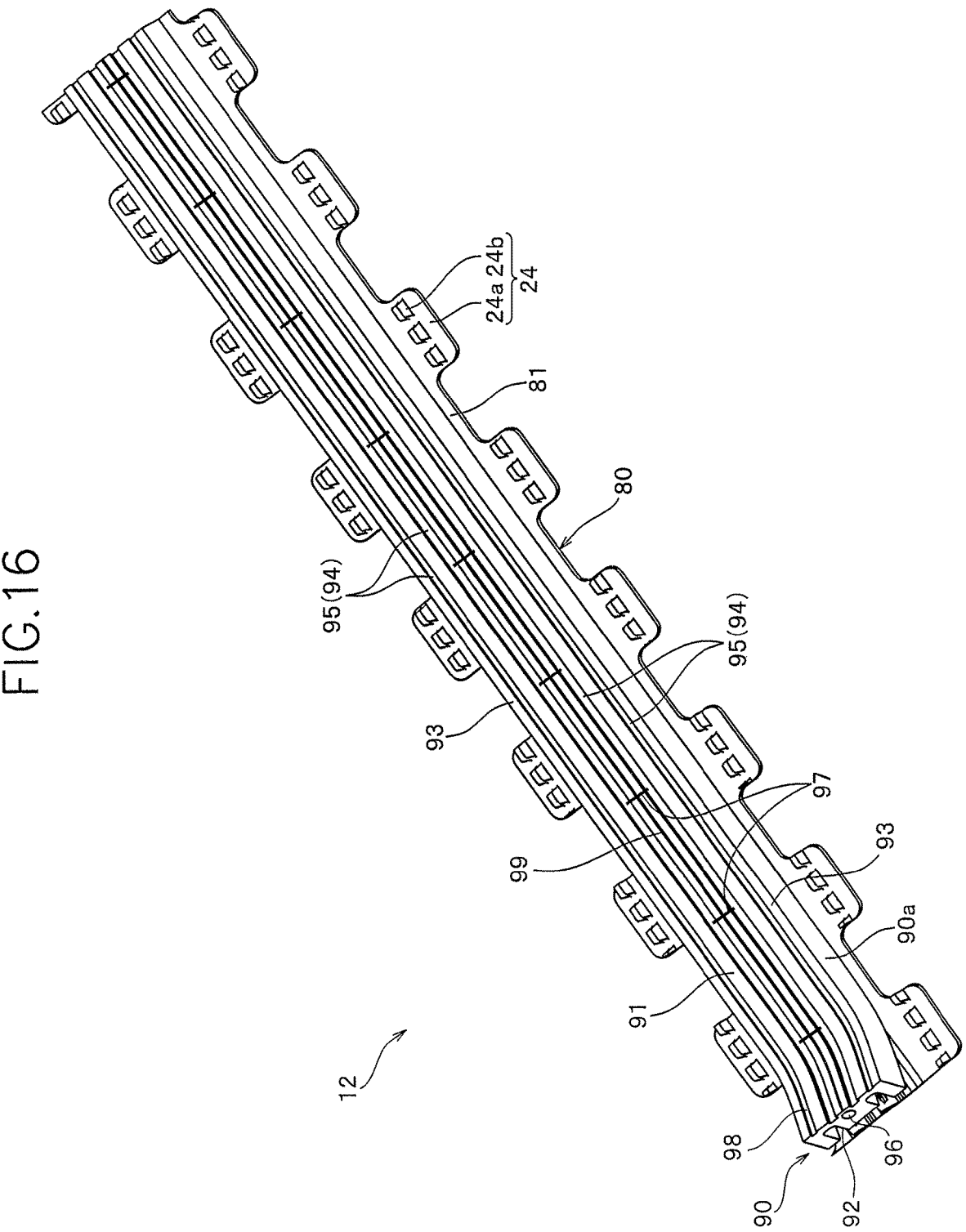
FIG. 16 is a perspective view schematically illustrating a surface fastener according to a third embodiment of the invention.
Figure 17:
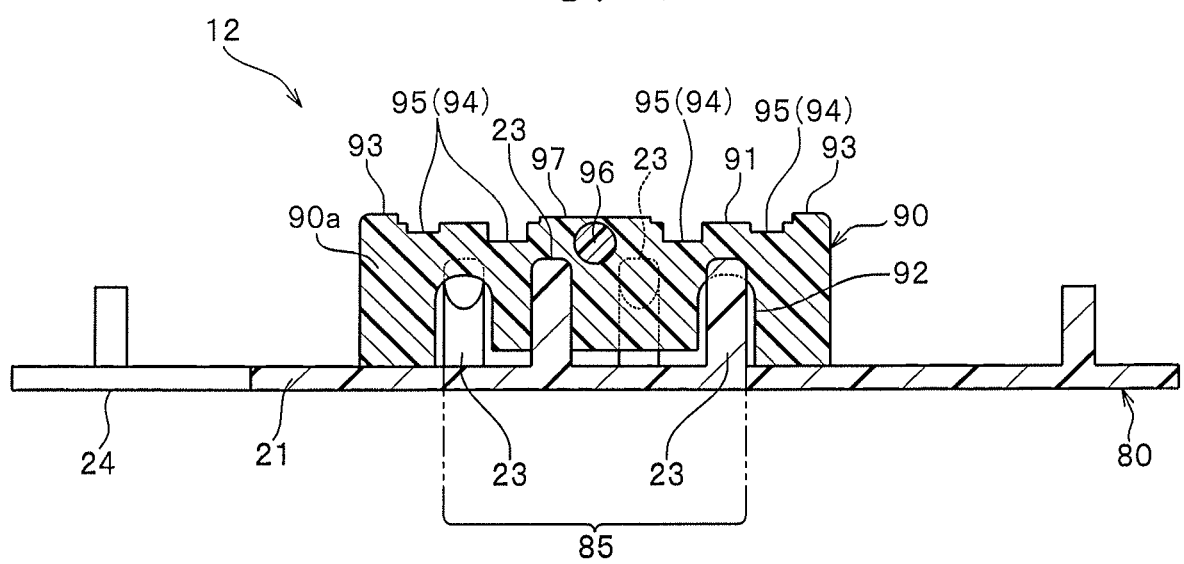
FIG. 17 is a cross-sectional view of the surface fastener illustrated in FIG. 16.

FIG. 16 is a perspective view schematically illustrating a surface fastener according to a third embodiment. FIG. 17 is a cross-sectional view illustrating a cross section orthogonal to the longitudinal direction of the surface fastener illustrated in FIG. 16.

The surface fastener 12 according to the third embodiment includes a fastener member 80 made of synthetic resin and formed long in the front-rear direction, and a masking member 90 detachably held on an upper surface side of the fastener member 80.

Figure 18:
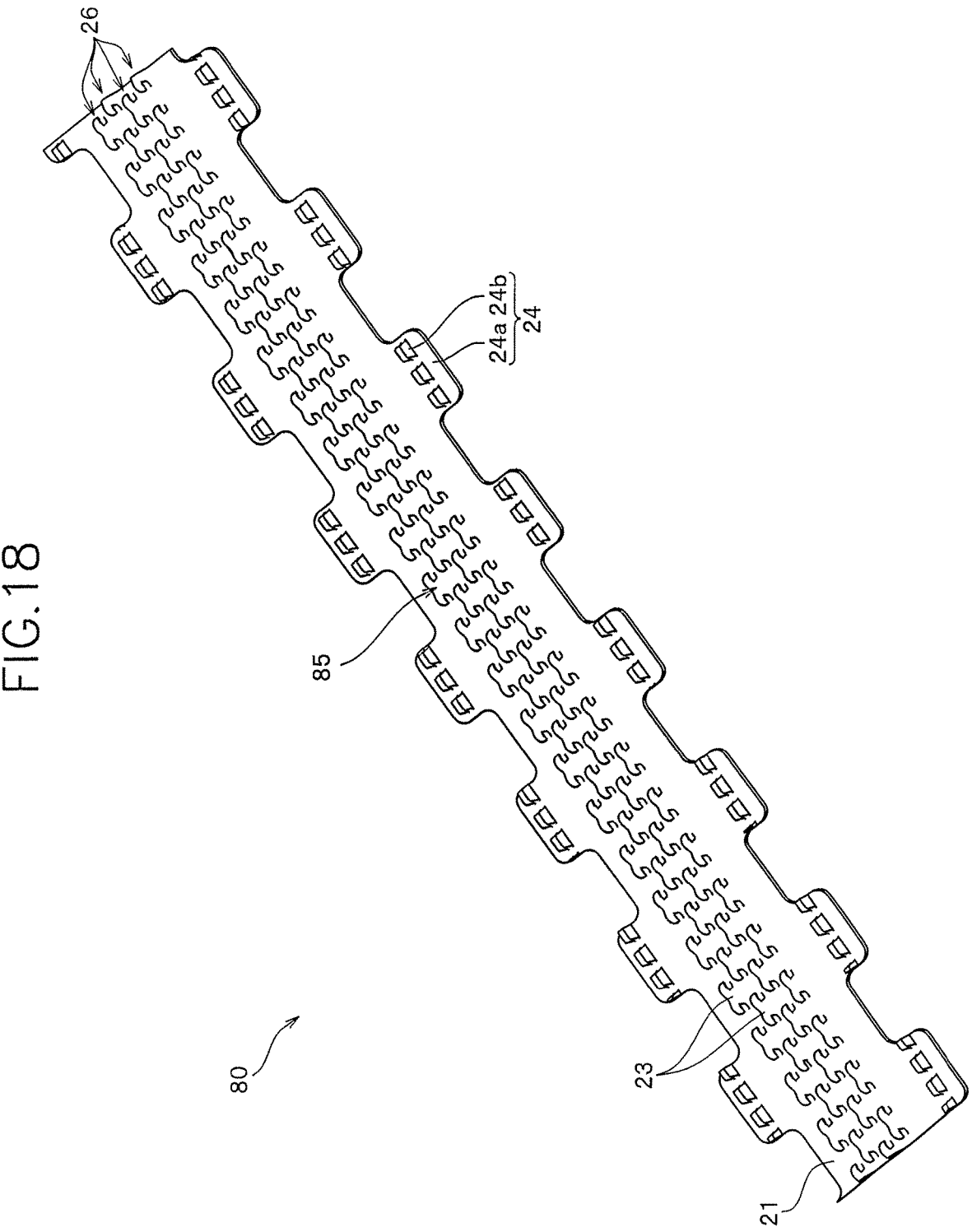
FIG. 18 is a perspective view schematically illustrating a fastener member of the surface fastener illustrated in FIG. 16.

The fastener member 80 of the third embodiment is formed by omitting the left and right vertical wall portions 22 from the fastener member 20 of the first embodiment described above and increasing the number of the engaging element rows 26 forming an engaging area 85 from three rows to four rows. That is, as illustrated in FIG. 18, the fastener member 80 of the third embodiment includes the thin plate-shaped base portion 21, the plurality of hook-shaped engaging elements 23 forming the engaging area 85, and the plurality of ear parts 24 extending in the left-right direction from the base portion 21. In addition, the plurality of engaging elements 23 forms four engaging element rows 26 along the longitudinal direction, and is arranged in a staggered manner as a whole.

The masking member 90 of the third embodiment has a constant width dimension larger than the engaging area 85 of the fastener member 80, and is continuously formed over substantially the entire longitudinal direction of the fastener member 80. The masking member 90 includes a masking main body part 90a, a monofilament 96 containing magnetic particles embedded in the masking main body part 90a, and a plurality of fixing ribs 97 protruding along the width direction on the upper surface of the masking main body part 90a. In addition, at one end part in the longitudinal direction of the masking member 90 of the third embodiment, a bent portion 98 for facilitating the peeling off of the masking member 90 is provided. Such a bent portion 98 of the third embodiment can also be provided in the masking member 30 of the first embodiment described above.

In this case, the monofilament 96 is formed using the same material as the monofilament 22a containing the magnetic particles fixed to the fastener member 20 of the first embodiment described above. The monofilament 96 is linearly embedded along the longitudinal direction at the upper end part of the masking main body part 90a and at the central part in the width direction of the masking main body part 90a. A slit-shaped exposed portion 99 for exposing the monofilament 96 is provided along the monofilament 96 at the upper end part of the masking main body part 90a.

The fixing ribs 97 of the masking member 90 are formed along the width direction to cover the monofilament 96 across the exposed portion 99 of the masking main body part 90a, and each of the fixing ribs 97 is raised from a masking outer surface 91 of the masking main body part 90a. The plurality of fixing ribs 97 provided at constant intervals in the longitudinal direction prevents the monofilament 96 from being separated and falling off from the masking main body part 90a.

The masking member 90 of the third embodiment may be formed without the fixing ribs 97. In addition, in the masking member 90 of the third embodiment, instead of embedding the monofilament 96 containing magnetic particles in the masking main body part 90a, a magnetic region containing magnetic particles may be continuously formed along the longitudinal direction by performing two-color molding using synthetic resin for masking that forms the masking main body part 90a and synthetic resin containing magnetic particles.

The masking main body part 90a has the planar masking outer surface (masking upper surface) 91 exposed upward and a masking inner surface (masking lower surface) 92 facing the base portion 21. The masking outer surface 91 is provided with a plurality of recess portions 94 each having a shape recessed toward the base portion 21, and left and right side edge portions 93 respectively disposed on the left and right side edges (end parts in the width direction) of the masking main body part 90a. The recess portions 94 provided on the masking outer surface 91 have four vertical groove portions 95 provided linearly along the longitudinal direction. The four vertical groove portions 95 of the third embodiment are formed substantially similarly to the four vertical groove portions 35 provided in the masking member 30 of the first embodiment described above.

Since the masking main body part 90a is provided with left and right side edge portions 93, the strength at both left and right end parts of the masking member 90 can be improved. In addition, it is possible to make it difficult for the foam resin to intrude the inside beyond the side edge portions 93 at the time of foam-molding of the cushion body. Further, when the surface fastener 12 is held in the molding die of the cushion body, the contact area between the surface fastener 12 and the die can be made smaller to reduce the frictional resistance generated between the surface fastener 12 and the die, and thus the above-described self-alignment effect can be exerted.

The masking inner surface 92 of the masking main body part 90a is disposed away from the base portion 21, and is formed into an uneven surface that changes the separation distance from the base portion 21 when the transverse cross section of the masking member 90 is viewed (see FIG. 17). Therefore, a space portion is provided between the upper surface of the base portion 21 and the masking inner surface 92 of the masking member 90.

The masking inner surface 92 is provided with two recessed inner groove portions extending toward the masking outer surface 91. In this case, the two inner groove portions are provided corresponding to the position of the engaging element row 26 disposed on the leftmost side and the position of the engaging element row 26 disposed on the rightmost side among the four engaging element rows 26 of the fastener member 80. Since the masking inner surface 92 as described above is provided on the masking main body part 90a, the masking member 90 can be easily peeled off from the fastener member 80.

Next, a manufacturing apparatus for manufacturing the surface fastener 12 of the third embodiment will be described. The manufacturing apparatus of the third embodiment includes a first molding apparatus for molding the fastener member 80 and a second molding apparatus 60a illustrated in FIG. 19 for molding the masking member 90.

The first molding apparatus of the third embodiment is formed by omitting the monofilament supply part and changing the shape of the molding cavity provided in the outer peripheral surface part of the die wheel 52 as compared with the first molding apparatus 50 of the first embodiment illustrated in FIG. 5.

Figure 19:
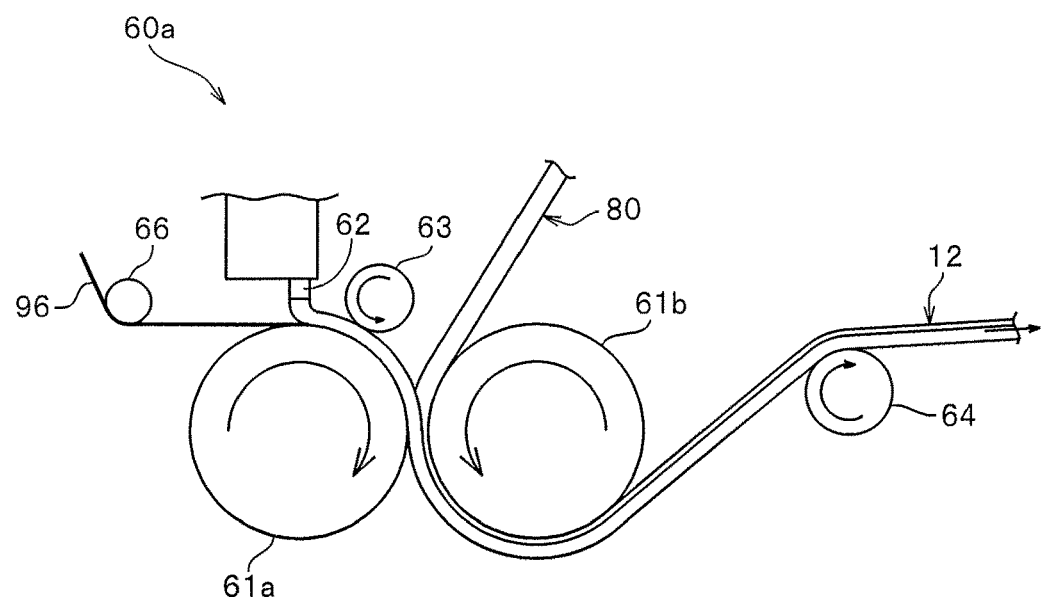
FIG. 19 is a schematic view schematically illustrating the second molding apparatus used for manufacturing the surface fastener illustrated in FIG. 16.

The second molding apparatus 60a illustrated in FIG. 19 includes the pair of left and right attaching rollers 61a and 61b, the second nozzle portion 62 that supplies synthetic resin for masking (or elastomer for masking), the monofilament supply part (not illustrated) that supplies the monofilament 96 containing magnetic particles, and a guide roller 66 that guides the supplied monofilament 96 to the outer peripheral surface of the left attaching roller 61a.

Further, the second molding apparatus 60a includes the molding roller 63 that imparts a predetermined shape to the synthetic resin for masking supplied to the left attaching roller 61a, the fastener supply part (not illustrated) that supplies the fastener member 80 toward the right attaching roller 61b, and the conveying roller 64 that feeds the fastener member 80 to which the synthetic resin for masking is attached by the left and right attaching rollers 61a and 61b to the downstream side.

In the third embodiment, the right attaching roller 61b, the second nozzle portion 62, the fastener supply part (not illustrated), and the conveying roller 64 in the second molding apparatus 60a are formed in the same manner as the second molding apparatus 60 of the first embodiment illustrated in FIG. 6.

On the outer peripheral surface of the left attaching roller 61a in the third embodiment, in order to impart the above-described shapes of the vertical groove portions 95 and the side edge portions 93 as described above to the masking outer surface 91 of the masking main body part 90a, similarly to the case of the first embodiment described above, the first outer peripheral surface 65a forming the masking outer surface 91 of the masking member 90, four protruding portions 65b protruding outward in the radial direction of the attaching roller 61a from the first outer peripheral surface 65a, and the second outer peripheral surface 65c disposed on both left and right sides of the first outer peripheral surface 65a and formed at a position lower than the first outer peripheral surface 65a are provided (see FIG. 7).

Further, in the left attaching roller 61a, in order to provide the plurality of fixing ribs 97 described above on the masking member 90, a plurality of recessed groove portions (not illustrated) having a shape and a size corresponding to the fixing ribs 97 of the masking member 90 is provided on the outer peripheral surface of the left attaching roller 61a along the cross direction (CD) orthogonal to the machine direction (MD).

On the outer peripheral surface of the molding roller 63 in the third embodiment, when the masking member 90 is attached to the fastener member 80, the masking inner surface 92 of the masking main body part 90a is formed as an uneven surface that can be formed into a predetermined surface shape as illustrated in FIG. 17.

In the case of manufacturing the surface fastener 12 of the third embodiment using the manufacturing apparatus as described above, first, the fastener member 80 illustrated in FIG. 18 is manufactured using the first molding apparatus. The manufacturing process of the fastener member 80 in the third embodiment is substantially the same as the manufacturing process of the fastener member 20 described in the first embodiment except that the monofilament 22a is not supplied.

Next, a process of attaching the synthetic resin for masking to the fastener member 80 manufactured by the first molding apparatus is performed using the left and right attaching rollers 61a and 61b in the second molding apparatus 60a. In the third embodiment, first, the monofilament 96 containing magnetic particles is guided to the outer peripheral surface of the left attaching roller 61a, and the synthetic resin for masking is supplied from the second nozzle portion 62 toward the left attaching roller 61a in a melted state. Thus, the monofilament 96 can be inserted and embedded in a predetermined position of the synthetic resin for masking.

In addition, the shapes of the masking outer surface 91, the vertical groove portions 95, and the side edge portions 93 of the masking member 90 are formed in the synthetic resin for masking supplied to the left attaching roller 61a, and the fixing ribs 97 are molded. Subsequently, by bringing the synthetic resin for masking into contact with the molding roller 63, a shape capable of forming the masking inner surface 92 of the masking member 90 is imparted to the synthetic resin for masking.

Subsequently, on the downstream side of the molding roller 63, the synthetic resin for masking is attached to the fastener member 80 by the left and right attaching rollers 61a and 61b as in the above-described first embodiment. After that, the fastener member 80 is fed out toward the cutting apparatus (not illustrated) on the downstream side by the conveying roller 64, and the left and right ear parts 24 are formed on the fastener member 80. Further, the surface fastener 12 can be cut into a predetermined length by the cutting apparatus.

Finally, one end part of the masking member 90 is partially peeled off from the fastener member 80, and the peeled off part is bent to form the bent portion 98 in the masking member 90.

Accordingly, the surface fastener 12 of the third embodiment illustrated in FIG. 16 is manufactured.

The surface fastener 12 of the third embodiment manufactured as described above is integrated and fixed to the cushion body such as a seat for an automobile when performing foam-molding of the cushion body as in the first embodiment. At this time, according to the surface fastener 12 of the third embodiment, substantially the similar effect as that of the surface fastener 10 of the first embodiment can be obtained.

Note that, also in the surface fastener 12 of the third embodiment, as the form of the recess portions 94 provided on the masking outer surface 91 of the masking main body part 90a, other forms such as the forms illustrated in FIGS. 9 to 14 can be used.

Figure 20:
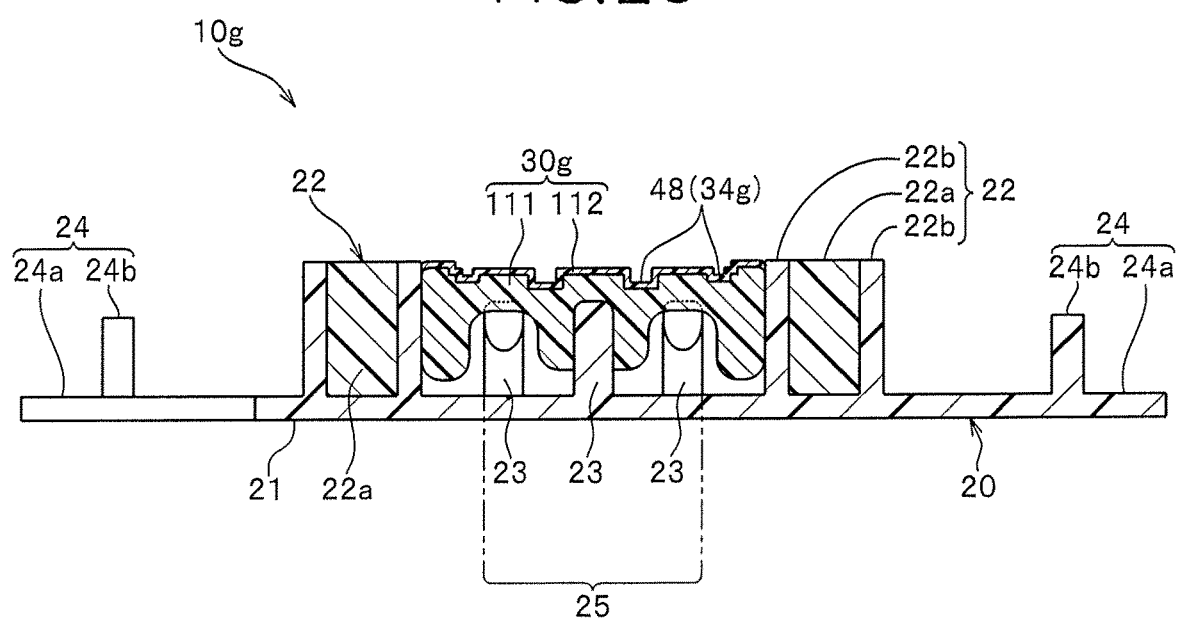
FIG. 20 is a cross-sectional view schematically illustrating a cross section of a surface fastener according to a seventh modified example of the first embodiment.

The masking member according to the first to third embodiments described above is formed of, for example, a synthetic resin substantially containing no magnetic particles. However, the masking member of the invention is not limited to this, and may contain magnetic particles. For example, as FIG. 20 illustrates a surface fastener 10g according to a seventh modified example of the first embodiment, the surface fastener 10g of the seventh modified example is formed by detachably holding a masking member 30g containing magnetic particles on the fastener member 20 of the first embodiment.

The masking member 30g of the seventh modified example includes a masking main body 111 and an outer film portion 112 covering at least a part of the outer surface of the masking main body 111. On an outer surface of the masking member 30g, vertical groove portions 48 are provided as recess portions 34g. The masking main body 111 corresponds to the "masking member 30" of the first embodiment, and has an inner surface facing the base portion 21 and an outer surface disposed on an opposite side to the inner surface. Therefore, the outer surface of the masking main body 111 has the same shape as the masking outer surface 31 of the "masking member 30" of the first embodiment, and the plurality of vertical groove portions corresponding to the vertical groove portions 48 is formed on the outer surface of the masking main body 111. The masking main body 111 is made of synthetic resin containing magnetic particles.

The outer film portion 112 of the masking member 30g is made of a material having lower frictional resistance than the masking main body 111, and is made of, for example, cellophane or synthetic resin. Although the outer film portion 112 covers the entire outer surface of the masking main body 111 in the seventh modified example illustrated in FIG. 20, in the invention, an exposed portion that exposes the outer surface of the masking main body 111 may be provided by covering only a part of the outer surface of the masking main body 111 with the outer film portion 112.

Figure 21:
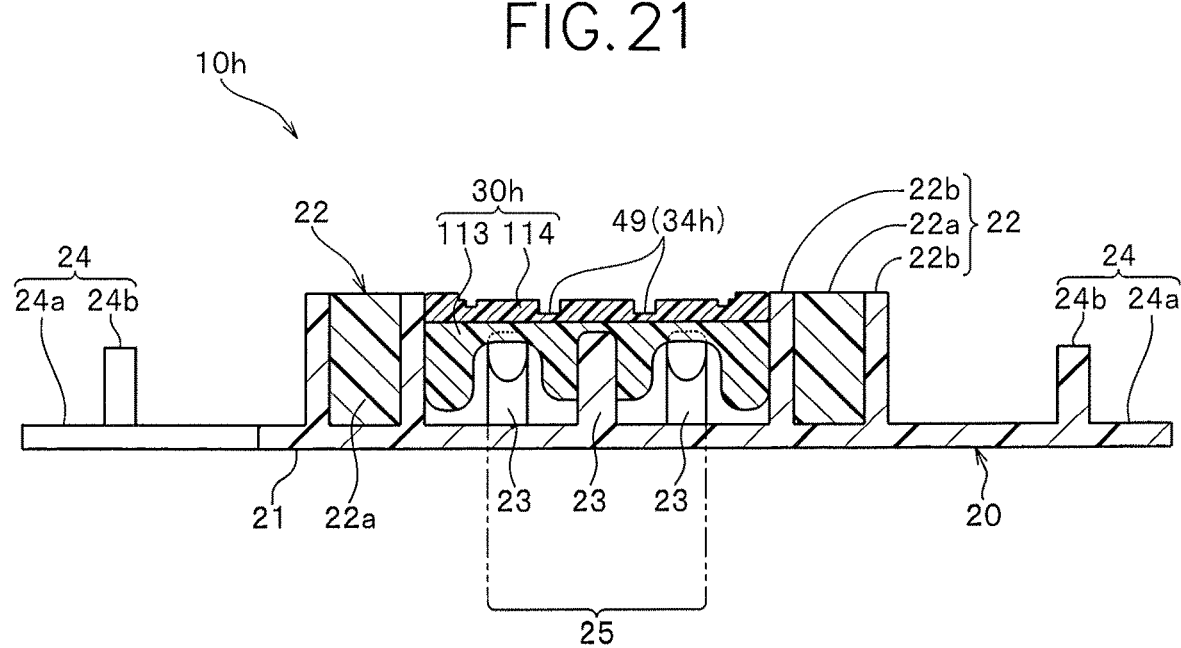
FIG. 21 is a cross-sectional view schematically illustrating a cross section of a surface fastener according to an eighth modified example of the first embodiment.

FIG. 21 illustrates a surface fastener 10h according to an eighth modified example of the first embodiment. In the surface fastener 10h of the eighth modified example, a masking member 30h containing magnetic particles is detachably held by the fastener member 20 of the first embodiment. The masking member 30h of the eighth modified example includes a masking main body 113 and an outer film portion 114 covering at least a part of the outer surface of the masking main body 113. The masking member 30h of the eighth modified example and masking member 30g of the seventh modified example illustrated in FIG. 20 are different from each other in the shape of the outer surface of a masking main body 113 and the shape of the lower surface of an outer film portion 114.

That is, the outer surface of the masking main body 113 in the eighth modified example is formed in a planar shape without a recess portion. The lower surface of the outer film portion 114 covering the masking main body 113 is also formed in a planar shape corresponding to the outer surface of the masking main body 113. The upper surface of the outer film portion 114 disposed on the side opposite to the lower surface is formed in the same shape as the masking outer surface 31 of the "masking member 30" of the first embodiment, and on the upper surface of the outer film portion 114, four vertical groove portions 49 are provided as recess portions 34h.

Also in the surface fastener 10g of the seventh modified example illustrated in FIG. 20 and the surface fastener 10h of the eighth modified example illustrated in FIG. 21 described above, the similar effect as that of the first embodiment described above can be obtained. In the seventh modified example and the eighth modified example, the magnetic particles may be contained in any one of the masking main bodies 111 and 113 and the outer film portions 112 and 114 of the masking members 30g and 30h, or may be contained in both of them. The masking members 30g and 30h in the seventh modified example and the eighth modified example may be formed by two-color molding.

Thus, since not only the fastener members 20 of the surface fasteners 10g and 10h but also the masking members 30g and 30h contain magnetic particles, the surface fasteners 10g and 10h can be more easily held with respect to the die in which the magnet is installed. Further, the self-alignment effect of the surface fasteners 10g and 10h can be improved. In addition, since the masking members 30g and 30h are further provided with the outer film portions 112 and 114 having frictional resistance lower than that of the outer surface of the masking main bodies 111 and 113 as described above, the self-alignment effect can be further enhanced. Therefore, the position and direction of the surface fasteners 10g and 10h of the seventh modified example and the eighth modified example attached to the die can be automatically adjusted with higher accuracy.

In the fastener member 20 (that is, the fastener member 20 of the first embodiment) of the seventh modified example and the eighth modified example, the monofilament 22a containing magnetic particles is fixed to the left and right vertical wall portions 22. However, since the masking members 30g and 30h contain magnetic particles, the left and right vertical wall portions 22 of the fastener member 20 may be formed of only synthetic resin substantially not containing magnetic particles as in the ninth modified example illustrated in FIG. 22, for example.

Figure 22:
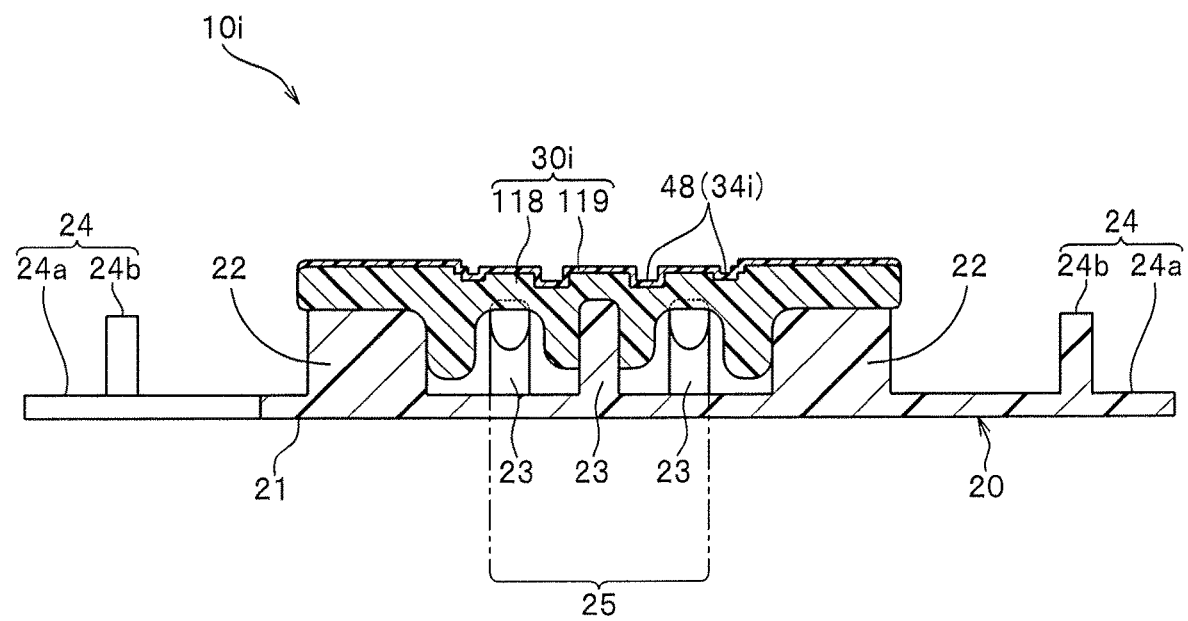
FIG. 22 is a cross-sectional view schematically illustrating a cross section of a surface fastener according to a ninth modified example of the first embodiment.

In a surface fastener 10i of the ninth modified example illustrated in FIG. 22, the shape of the left and right vertical wall portions 22 is not limited, and for example, a plurality of vertical wall bodies may be intermittently disposed in the length direction, or may be arranged in a staggered manner. A masking member 30i in the ninth modified example is provided to cover the left and right vertical wall portions 22. In this case, the masking member 30i may cover at least the top end surfaces of left and right vertical wall portions 22. The masking member 30i includes a masking main body 118 and an outer film portion 119 covering at least a part of the outer surface of the masking main body 118. On the outer surface of the masking member 30i, the vertical groove portions 48 similar to that of the seventh modified example are provided as recess portions 34i.

Further, in the seventh modified example and the eighth modified example, the masking members 30g and 30h are provided in the region between the left and right vertical wall portions 22 of the fastener member 20 (see FIGS. 20 and 21), and the outer film portions 112 and 114 capable of reducing the frictional resistance are provided on the masking outer surfaces of the masking members 30g and 30h as described above. However, in the invention, the masking members 30g and 30h including the outer film portions 112 and 114 may be formed to cover, for example, the top end surfaces (upper surfaces) of the vertical wall portions 22 of the fastener member 20. Thus, in the case that the surface fastener is held in the die in which the magnet is installed, the position and direction of the surface fastener can be more smoothly and automatically adjusted when the self-alignment effect is used.

When a masking member is formed by laminating a plurality of members as in the seventh modified example, the eighth modified example, and the ninth modified example, the number of layers may be three or more. In this case, the layer corresponding to the masking outer surface (corresponding to the outer film portion in the claims) may have a frictional resistance lower than that of any other layer (corresponding to the masking main body in the claims). The masking member does not have to necessarily contain magnetic particles. Thus, when the surface fastener is held in the die, position adjustment can be easily performed, and the position and direction of the fastener can be more smoothly adjusted without using magnetic force.

Figure 23:
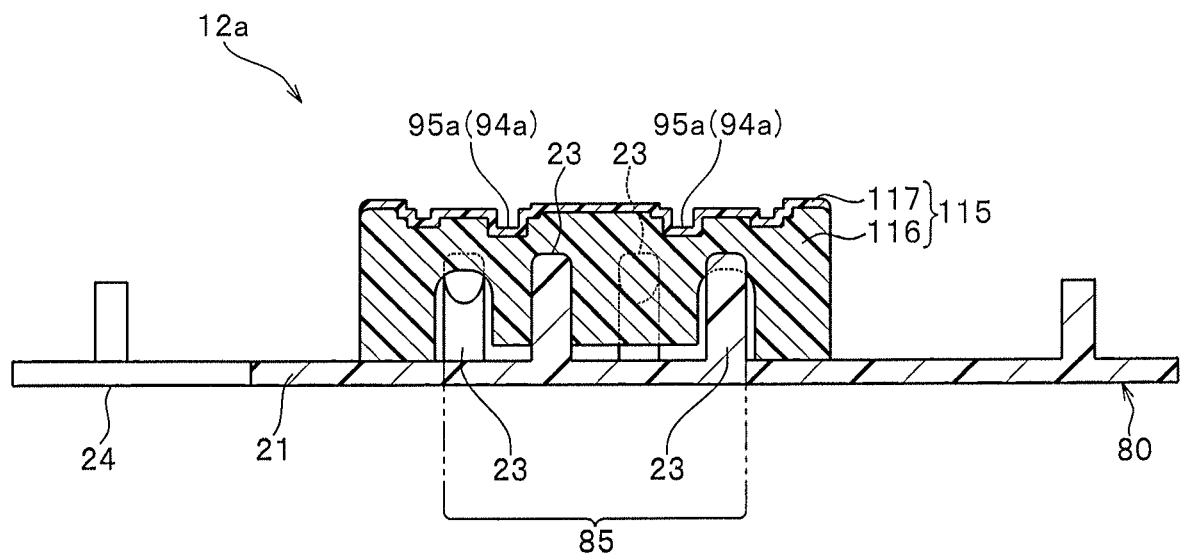
FIG. 23 is a cross-sectional view schematically illustrating a cross section of a surface fastener according to a first modified example of the third embodiment.
Figure 24:
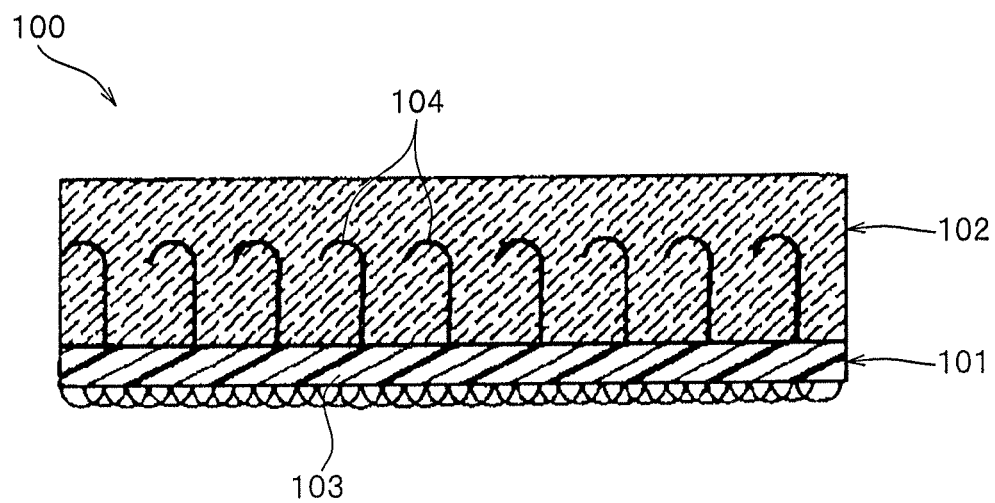
FIG. 24 is a cross-sectional view illustrating a conventional surface fastener.

Next, FIG. 23 illustrates a surface fastener 12a according to a first modified example of the third embodiment. The surface fastener 12a is formed by detachably holding a masking member 115 containing magnetic particles on the fastener member 80 of the third embodiment.

The masking member 115 according to the first modified example of the third embodiment includes a masking main body 116 and an outer film portion 117 covering at least a part of the outer surface of the masking main body 116. On the outer surface of the masking member 115, vertical groove portions 95a are provided as recess portions 94a. The masking main body 116 substantially corresponds to the "masking member 90" of the third embodiment, and has an inner surface facing the base portion 21 and an outer surface disposed on an opposite side to the inner surface. In this case, although the masking main body 116 is not provided with the monofilament 96 and the fixing ribs 97 of the third embodiment, the outer surface of the masking main body 116 has substantially the same shape as the masking outer surface 91 of the "masking member 90" of the third embodiment. The outer surface of masking main body 116 is provided with a plurality of vertical groove portions corresponding to the vertical groove portions 95a. The masking main body 116 is made of synthetic resin containing magnetic particles.

The outer film portion 117 of the masking member 115 is made of a material having lower frictional resistance than the masking main body 116, and is made of, for example, cellophane, synthetic resin, or a magnet sheet. Although the outer film portion 117 covers the entire outer surface of the masking main body part 116 in FIG. 23, in the invention, an exposed portion that exposes the outer surface of the masking main body 116 may be provided by covering only a part of the outer surface of the masking main body 116 with the outer film portion 117.

Also in the surface fastener 12a illustrated in FIG. 23, the similar effect as that of the first embodiment described above can be obtained. In this case, magnetic particles may be contained in either the masking main body 116 and the outer film portion 117 in the masking member 115, or may be contained in both of them. The masking member 115 may be formed by two-color molding.

In the surface fastener 12a illustrated in FIG. 23, since the masking member 115 is provided with the outer film portion 117 having low frictional resistance, the self-alignment effect can be further enhanced, and accordingly, the position and direction of the surface fastener 12a attached to the die can be automatically adjusted with higher accuracy in accordance with the magnet of the die.

In the invention, the material of the masking member is not limited to synthetic resin or elastomer. For example, it may be fabric such as felt fabric or paper.

As described above, the shape of the recess portion is not particularly limited, and is not limited to a shape having a groove bottom surface and a pair of groove wall surfaces rising from both side edge portions of the groove bottom surface. For example, the recess portion may include a slope, a smooth curved surface, a polygonal shape, a step, or a partial hollow, or may be formed by a combination of them. In addition, the recess portion includes not only the above-described vertical groove portion, the depressed portion, the lateral groove portion, and a recess portion having the shape of a combination of them but also a recess portion having other shapes such as a groove part curved in a wave shape and a groove part having a plurality of bent portions bent in a crank shape.

In addition, the size of the recess portion, for example, the groove depth of the vertical groove portion and the lateral groove portion, the groove width, and the interval between the adjacent grooves are not particularly limited, and can be changed according to the size, use, and the like of the surface fastener. For example, in the case of the first embodiment, all the four vertical grooves may be formed with the same groove depth and groove width, or the four vertical groove portions may be formed with different groove depths and groove widths each other. In addition, the recess portion is not limited to a part provided along the longitudinal direction or the width direction of the fastener member, and may include a part provided along a direction inclined at an angle with respect to the longitudinal direction.

Further, the recess portion is preferably formed at a position not overlapping the engaging element row in the width direction, but the invention is not limited to this. A part or the whole of the recess portion may overlap the engaging element row in the width direction. In addition, the number of recess portions can be arbitrarily changed.

REFERENCE SIGNS LIST 10, 10f Surface fastener
10g, 10h Surface fastener
10i Surface fastener
12, 12a Surface fastener
20 Fastener member
21 Base portion
22 Vertical wall portion
22a Monofilament
22b Reinforcement rib
23 Engaging element
24 Ear part
24a Ear main body portion
24b Protruding wall portion
25 Engaging area
26 Engaging element row
30, 30a Masking member
30b, 30c Masking member
30d, 30e Masking member
30f, 30g Masking member
30h, 30i Masking member
31, 31a Masking outer surface (masking upper surface)
31b, 31c Masking outer surface
31d, 31e Masking outer surface
31f Masking outer surface
32 Masking inner surface (masking lower surface)
33 Side edge portion
34, 34a Recess portion
34b, 34c Recess portion
34d, 34e Recess portion
34g, 34h Recess portion
34i Recess portion
35 Vertical groove portion (recessed groove portion in vertical direction)
35a First vertical groove portion
35b Second vertical groove portion
36 Space portion
37 Inner groove portion
41 Vertical groove portion
42 Depressed portion
43 Vertical groove portion
44, 45 Lateral groove portion
46 Lateral groove portion
47a First vertical groove portion
47b Second vertical groove portion
48, 49 Vertical groove portion
50 First molding apparatus
51 First nozzle portion
51a Flow path portion
51b Wheel facing surface
51c Resin supply port
52 Die wheel
53 Pickup roller
60, 60a Second molding apparatus
61a Left attaching roller
61b Right attaching roller
62 Second nozzle portion
63 Molding roller (masking roller)
64 Conveying roller
65a First outer peripheral surface
65b Protruding portion
65c Second outer peripheral surface
66 Guide roller
70 Die
71 Lower die (fixed die)
72 Fastener holding portion
73 Magnet
74 Foam resin
80 Fastener member
85 Engaging area
90 Masking member
90a Masking main body part
91 Masking outer surface (masking upper surface)
92 Masking inner surface (masking lower surface)
93 Side edge portion
94, 94a Recess portion
95, 95a Vertical groove portion
96 Monofilament
97 Fixing rib
98 Bent portion
99 Exposed portion
111 Masking main body
112 Outer film portion
113 Masking main body
114 Outer film portion
115 Masking member
116 Masking main body
117 Outer film portion
118 Masking main body
119 Outer film portion

The invention claimed is:

1. A surface fastener including:
a fastener member and a masking member removably held by the fastener member, wherein
the fastener member includes a base portion that is long and has a first surface and a second surface, and a plurality of engaging elements protruding from the first surface of the base portion,
the masking member is disposed on the first surface of the base portion and covers at least a part of the engaging elements,
an engaging element row along a longitudinal direction of the base portion is formed by the plurality of engaging elements arranged along the longitudinal direction,
the masking member has a masking inner surface facing the base portion and a masking outer surface disposed on an opposite side to the masking inner surface, and
the masking outer surface is provided with at least one recess portion,
the recess portion of the masking member includes a vertical groove portion provided along the longitudinal direction,
the vertical groove portion is formed at positions not overlapping the engaging element row in a width direction.

2. The surface fastener according to claim 1, wherein the recess portion is disposed inward away from a side edge position in a width direction of the masking member.

3. The surface fastener according to claim 1, wherein the recess portion of the masking member includes a vertical groove portion provided along a longitudinal direction of the fastener member.

4. The surface fastener according to claim 1, wherein the recess portion of the masking member includes a plurality of depressed portions intermittently provided along a longitudinal direction of the fastener member.

5. The surface fastener according to claim 1, wherein the recess portion of the masking member includes a plurality of lateral groove portions provided along a width direction of the fastener member.

6. The surface fastener according to claim 1, wherein the recess portion of the masking member includes a plurality of the recess portions having different depths from the masking outer surface to a bottom portion of the recess portion.

7. The surface fastener according to claim 1, wherein the masking outer surface of the masking member undulates in a height direction along a longitudinal direction of the fastener member.

8. The surface fastener according to claim 1, wherein the masking member contains a magnetic particle.

9. The surface fastener according to claim 1, wherein
the masking member includes a masking main body having an inner surface facing the base portion and an outer surface disposed on an opposite side to the inner surface, and an outer film portion covering at least a part of the outer surface of the masking main body, and
the outer film portion has a coefficient of friction against a molding die lower than that of the masking main body.

10. The surface fastener according to claim 9, wherein at least one recess portion is provided on the outer surface of the masking main body.

11. The surface fastener according to claim 1, wherein the recess portion of the masking outer surface is provided to include an end part in a width direction of the masking outer surface.

12. The surface fastener according to claim 1, wherein the recess portion of the masking outer surface is provided along a longitudinal direction of the fastener member at both end parts in a width direction of the masking outer surface.

13. The surface fastener according to claim 1, wherein
the fastener member includes an engaging area including the plurality of the engaging elements, and left and right vertical wall portions disposed outside a width direction of the engaging area and provided along a longitudinal direction of the fastener member,
the masking member has a side edge portion at each of both end parts in a width direction of the masking outer surface, and
the side edge portion is disposed adjacent to an inner side of the vertical wall portion along a longitudinal direction of the fastener member.

* * * * *

UNITED STATES PATENT AND TRADEMARK OFFICE
CERTIFICATE OF CORRECTION

| | | |
|---|---|---|
| PATENT NO. | : 11,898,595 B2 | Page 1 of 1 |
| APPLICATION NO. | : 17/634204 | |
| DATED | : February 13, 2024 | |
| INVENTOR(S) | : Zhiyu Ren et al. | |

It is certified that error appears in the above-identified patent and that said Letters Patent is hereby corrected as shown below:

On the Title Page

In item (30), in Column 1, in "Foreign Application Priority Data", Line 1, delete "(WO)" and insert -- (JP) --.

In item (30), in Column 1, in "Foreign Application Priority Data", Line 3, delete "(WO)" and insert -- (JP) --.

Signed and Sealed this
Ninth Day of April, 2024

Katherine Kelly Vidal
*Director of the United States Patent and Trademark Office*